US 7,340,510 B1

(12) United States Patent
Liskov et al.

(10) Patent No.: US 7,340,510 B1
(45) Date of Patent: Mar. 4, 2008

(54) CONTENT DELIVERY NETWORK (CDN) REPLICATION STATUS REPORTER

(75) Inventors: Barbara Liskov, Waltham, MA (US); Dmitry Stavisky, Wayland, MA (US); Stephen Jeffrey Morris, Harvard, MA (US)

(73) Assignee: Cisco Technology, Inc., San Jose, CA (US)

( * ) Notice: Subject to any disclaimer, the term of this patent is extended or adjusted under 35 U.S.C. 154(b) by 789 days.

(21) Appl. No.: 10/715,728

(22) Filed: Nov. 18, 2003

(51) Int. Cl.
*G06F 15/173* (2006.01)

(52) U.S. Cl. .................. 709/220; 709/226; 370/13; 370/390

(58) Field of Classification Search ............... 709/203, 709/220, 223, 229; 707/2–6; 714/1, 2
See application file for complete search history.

(56) References Cited

U.S. PATENT DOCUMENTS

| | | | |
|---|---|---|---|
| 5,907,837 A | 5/1999 | Ferrel | 707/3 |
| 6,122,648 A | 9/2000 | Roderick | 707/513 |
| 6,226,618 B1 | 5/2001 | Downs | 705/1 |
| 6,341,316 B1 | 1/2002 | Kloba | 709/248 |
| 6,421,717 B1 | 7/2002 | Kloba | 709/219 |
| 6,456,234 B1 | 9/2002 | Johnson | 342/357.09 |
| 6,484,143 B1 | 11/2002 | Swildens | 705/1 |
| 6,535,882 B2 | 3/2003 | Pasquali | 707/100 |
| 6,553,376 B1 | 4/2003 | Lewis | 701/1 |
| 6,553,412 B1 | 4/2003 | Kloba | 709/219 |
| 6,636,856 B2 | 10/2003 | Pasquali | 707/10 |
| 6,654,807 B2 | 11/2003 | Farber | 709/245 |
| 6,658,419 B2 | 12/2003 | Pasquali | 707/10 |
| 6,662,195 B1 | 12/2003 | Langseth | 707/200 |
| 7,020,697 B1* | 3/2006 | Goodman et al. | 709/223 |
| 2004/0010544 A1* | 1/2004 | Slater et al. | 709/203 |
| 2004/0010588 A1* | 1/2004 | Slater et al. | 709/224 |

* cited by examiner

*Primary Examiner*—David Wiley
*Assistant Examiner*—Jude J Jean-Gilles
(74) *Attorney, Agent, or Firm*—Chapin IP Law, LLC; Barry W. Chapin, Esq.

(57) ABSTRACT

Conventional replication status reporting techniques in a Content Delivery Network (CDN) tend to produce large, unwieldy reports which are difficult to transmit, consume large amounts of bandwidth, and require a large share of CPU resources to process. A replication status reporter which identifies an ordered list of events corresponding to content items (files) for replication (pre-positioning) in a content delivery network, and determines a point of progression along a sequence represented by the ordered list of files, allows a management server to avoid computationally expensive endeavors which itemize and transmit lists of every replicated file in the CDN. The servers in a CDN channel receive files as a series of ordered events. Origin servers deliver the files generally according the event. A replication status report indicates the progression in the list, rather than enumerating the entire list, avoids cumbersome and unnecessary processing and delays in reporting replication status.

45 Claims, 10 Drawing Sheets

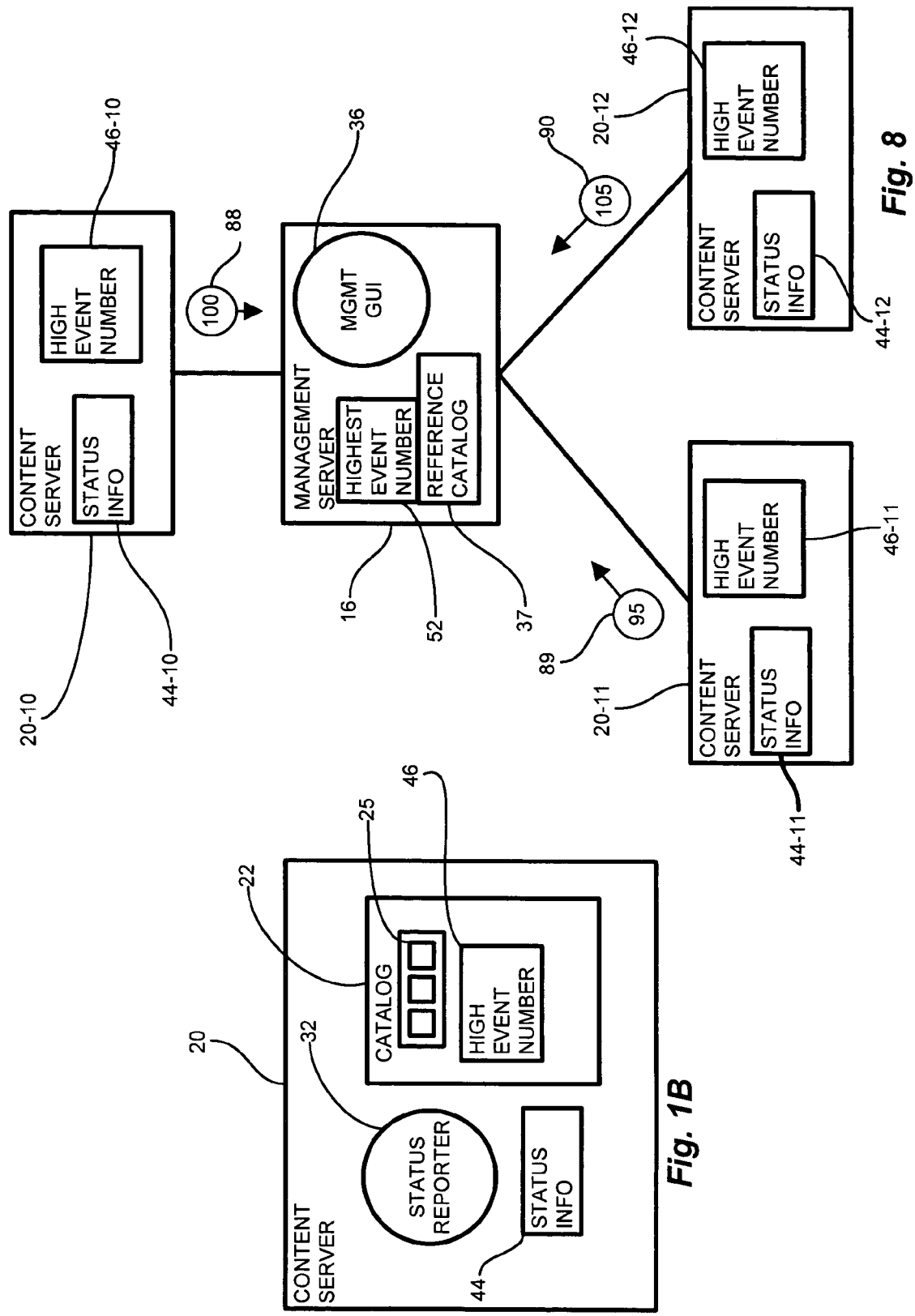

| FILE INFO | ORIGIN SERVER | PRIORITY | EVENT NO |
|---|---|---|---|
| Add File 1001 | 12a | 1 | E11 |
| Add file 1002 | 12a | 1 | E12 |
| Update file 1003 | 12a | 1 | E15 |
| . . . . . | | | |
| Add file 1005 | 12b | 1 | E22 |
| Add file 1006 | 12b | 1 | E23 |
| Add file 1007 | 12b | 1 | E24 |
| . . . . . | | | |
| Add file 1016 | 12b | 2 | E25 |
| Add file 1018 | 12b | 2 | E26 |
| Modify file 1016 | 12b | 2 | E30 |
| Update file 1016 | 12b | 2 | E31 |
| . . . . . | | | |
| Add file 1020 | 12a | 2 | E40 |
| . . . . . | | | |
| Add file 1021 | 12a | 3 | E41 |
| . . . . . | | | |
| Add file 1022 | 12b | 3 | E43 |
| . . . . . | | | |

*Fig. 6*

| ORDERING CATEGORY | ORIGIN SERVER | PRIORITY | EVENT NO | ERROR LIST |
|---|---|---|---|---|
| 1 | 12a | 1 | E12 | |
| 2 | 12a | 2 | E40 | |
| 3 | 12a | 3 | E41 | |
| 4 | 12b | 1 | E24 | E22, E23 |
| 5 | 12b | 2 | E31 | |
| 6 | 12b | 3 | E43 | |
| | | | E45 | |

*Fig. 7*

CONTENT DELIVERY NETWORK (CDN) REPLICATION STATUS REPORTER

BACKGROUND OF THE INVENTION

Content delivery networks allow content such as Internet-based media (Web Media) to be distributed to caching servers at various locations on the Internet, and then accessed from those servers by a plurality of users. In this manner, the users avoid inundating the origin servers where the content originates with a multitude of requests. Further, users receive more timely responsiveness because the caching servers are more proximate to the users than the origin servers. Also, the overall load demand for the content from the origin servers is therefore distributed among the caching servers.

A Content Distribution Network (CDN), therefore, allows web content to be distributed to caching servers at various locations in the Internet and then accessed from those servers. In this way the load on the origin servers where the content originates is reduced. Furthermore, users get better access to content because they are able to obtain it from a caching server that is closer to them (in terms of network distance and congestion) and less heavily loaded than the web server where the content originates.

In such a Content Delivery Network (CDN), a content provider defines a plurality of channels. Each of the channels contains a set of media items, or files, that bear a relationship to a particular user set, or group. For example, a channel might contain training videos for use by sales associates of a particular corporation or industry. The same channel might also contain examples of advertising media targeting a corporation's customers. The contents of such a channel changes over time in accordance with user demand in relation to the files contained therein.

To make content available through the CDN, the content provider defines one or more "channels". Each channel contains a set of files that are expected to be accessed by the same set of users; e.g., a channel might contain training videos intended to be used by sales people, or ads directed at the organization's customers. The content of a channel changes over time as the content provider adds new files to the channel and removes old ones.

Each channel is assigned to some subset of the content servers; these will typically be servers located conveniently for the intended set of users. The files in a channel need to be pre-positioned at the servers assigned to that channel. This way the provider of the content can be sure that the content is available when accessed. The servers assigned to the content may be behind a slow link relative to the origin server, and the files themselves may be very large, so that it can take a long time to move the content from the origin server to a server assigned to the channel. Pre-positioning the content ensures that users do not encounter any delays when they access the files.

Conventional CDNs, therefore, assign a plurality of content servers to each channel. Typically, a content provider disposes content servers in proximity to the users, to facilitate access and mitigate bandwidth delays. A conventional content provider downloads, or pre-positions, the files in the channel at the content servers so that such files are conveniently located near the users. Pre-positioning, therefore, assures that users do not encounter delays when accessing the media content in the channel.

Since pre-positioning the content avoids delays in delivering the content to the users, a conventional CDN avoids publishing a particular file as available via a particular CDN channel until the file completely or substantially completely propagates around the network. Conventional CDNs, therefore, strive to avoid disappointing users by overzealously publishing a file as available in anticipation of complete propagation of that file through the CDN. However, it is also disadvantageous to suppress reporting availability of a file, as users may not become aware that such a file is available until long after propagation. Accordingly, conventional CDNs anticipate a balance between estimating availability of a particular file, and avoiding false negative directives concerning file availability.

SUMMARY

Conventional CDNs provide banks of content servers in proximity to users to field requests for CDN material contained therein. The CDN provider disposes such banks of content servers because, for example, the originating servers of the media content files may be remote from the users, may be behind a relatively slow link in relation to the proximate content servers, or for other network transport reasons. The content servers store the media content items (content items) in groups of files called channels. The CDN deploys and maintains the content items in a channel by pre-positioning, or downloading, the content items from the origin server to the content servers maintaining the channel. Propagation of the content items (files) in a channel is discussed in further detail in copending U.S. patent application entitled "Methods and Apparatus for Performing Content Distribution in a Content Distribution Network,", assigned to the assignee of the present application, and incorporated herein by reference in its entirety.

In such a conventional CDN, it is beneficial to know which content items in a channel reside (i.e. via pre-positioning) at a particular content server. A typical conventional CDN employs a management server in communication with each group of content servers supporting the CDN. The management server coordinates and monitors activities at each of the conventional content servers, and an operator typically staffs the management server for maintenance purposes such as troubleshooting and querying the content servers in the CDN. For example, the operator may want to know the servers in a channel for which pre-positioning of the content items is completed, or alternatively, whether pre-positioning of a particular file is at least 90 percent of complete. The operator generates a query to interrogate to the content servers supporting the channel, and determines the status of the pre-positioning, that is, determines the files of the channel for which replication (i.e. downloading from the respective origin server) is complete.

Generally, the content provider wants to delay publishing URLs of files in a channel until they are pre-positioned at all or most of the servers assigned to that channel. A technique is needed for providing this "replication status" information in a way that is accurate, efficient, and easy for the operator to use.

Such conventional channels, however, tend to be rather large, containing many content items for replication from the origin servers. Further, the number of servers supporting a given channel can also be large, such as on the order of 50,000 servers. Also, multiple origin servers may support pre-positioning of a particular channel, in which the content servers multiplex the pre-positioning resources between the multiple origin servers. Accordingly, the management console may need to send out many requests for status to the plurality of content servers supporting the channel for which status is sought. Further, each of those servers needs to evaluate status for each of the files in the channel, and report this status back to the management console. Finally, the management console must correlate each of the file inventories from all of the reporting servers to generate a complete report of pre-positioning file replication.

A conceptually simple but computationally expensive conventional mechanism for the management server to compute replication status for a particular channel is for the management server to request a list of all attached, or pre-positioned, files from all the content servers assigned to channel. However, as indicated above, this conventional approach is highly undesirable because such a conventional list can be very large. Further, many of the content servers may only be able to communicate with the management server over high latency or low bandwidth links, therefore imposing a substantial delay until all, or almost all, of the content servers are able to report.

Alternatively, the conventional management server may request a list of files that have not completed pre-positioning. However, as the total number of files in the channel may be substantial, such negative lists can also be very large. Further, this conventional approach needs to handle the case of a recent addition that fails to appear in the report because the content server was unaware of the addition to the channel.

Another possible conventional approach is for the management server to request status of individual files by polling each of the content servers assigned to the channel. Such an approach, however, imposes substantial overhead because of the need to communicate individually with each of the servers for a single file, and further, the management console may require timely feedback from all servers, some of which may be unavailable immediately.

Unfortunately, conventional replication status reporting techniques suffer from a variety of deficiencies as outlined above. The conventional replication status reporting techniques tend to produce large, unwieldy reports which are difficult to transmit, consume large amounts of bandwidth, and require a large share of CPU resources to process. The number of such replicated files may be small, indicative of the channel receiving relatively few content items, in which case a replication status report identifying missing files is large. Alternatively, the number of replicated files may be large, in which case a replication status report identifying present media content items is voluminous. Further, the conventional replication status report may be sparse, having sporadic entries of received files commingled with vacant entries indicative of content items for which the origin server has not completed transmission.

Accordingly, it may be difficult and time consuming for an operator at a management console to determine which media content items (files) in a particular channel actually reside (i.e. are pre-positioned) at each content server. It would be beneficial, therefore, to provide a replication status mechanism which aggregates replication status of content items in a channel at a plurality of content servers, and reports the status in a timely, efficient manner to a common management server covering many such content servers so that the current replication status is obtainable on demand without requiring large amounts of bandwidth or processing to manipulate long manifests of content entries either already replicated or pending pre-positioning for each channel.

The present invention substantially overcomes the deficiencies with determining replication status in a CDN by providing a replication status reporter which identifies an ordered list of events corresponding to content items (e.g. files) for replication (e.g. pre-positioning) in a content delivery channel, and determines a point of progression along a sequence represented by the ordered list of files. The servers in a CDN channel receive files according to a set of rules, which define the set of channel files as a series of ordered events. Further, the files in a particular channel change over time, causing new files to become active and others to become inactive. An origin server (or servers) delivers the files generally according to a channel list of files, and augmented by the rules to pre-position more critical files first and avoid unnecessary delays due to unavailable files, transmission errors, bottlenecks, etc.

The invention allows the management server to avoid these expensive approaches. It does need to know what files are in the channel, but it can find this out by communicating with just a single content server. It only requires a small "status report" from the other content servers, and this report covers all files in the channel. The status reports are sufficiently small that the management server might gather them regularly, e.g., they might be sent whenever a content server communicates with the management server. Gathering reports like this allows the management server to maintain a complete but somewhat out-of-date replication status for the channel. The out-of-date information can be useful to the content provider, since it is a good indicator of how well the system is doing in pre-positioning files in the channel, and also it gives some idea of the status for any particular file in the channel. If the operator requires up-to-date information, the management server will need to request this from all the servers assigned to the channel. But even though there may be many of them, and even though the connection between them and the management server may be slow, the small size of the reports makes the approach practical.

The scheme provides a substantial benefit because of the size of the channel, the number of servers assigned to the channel, the amount of information desired by the content provider, and the potentially slow links between the management server and the other servers assigned to the channel.

The system of the present invention, therefore, provides a pre-positioning status mechanism which allows the management server to avoid such computationally expensive endeavors. Using the system of the present invention, the management server determines a list of current files in the channel for the servers supporting a channel. The management server then receives only a small, incremental replication status report, as defined further below, indicative of a relative progression in the list of current files. A channel is characterized by a catalog, which indicates the content items which should be in the channel, pending, of course, propagation delays. In other words, each channel, or more specifically, each content server in the channel, is trying to satisfy the events in the catalog to attain a completely current channel of content items. Such is the case when all events in the catalog have been fulfilled. In actuality, new events are added to the catalog while each content server is attempting to satisfy (complete) the events. Also, each content server maintains its own version of the catalog, so individual content servers may vary slightly with respect to events in the catalog and for content items which have been pre-positioned.

The replication status reporter further subdivides the files in a channel into ordering categories according to priority groups and origin servers from which the files emanate. A progression threshold within each of the ordering categories indicates the progression of files pre-positioned, or downloaded, for the set of files in that ordering category. Since the set of files is ordered, an indication of the progression in the sequence, rather than an exhaustive list of files transmitted or of files not yet received, identifies the files which the content server has pre-positioned. In this manner, a report including the ordering category and the current file indicates that previous files in the sequence have been pre-positioned and successive files in the sequence are still pending. Further, an error list of files failing pre-positioning, due to network failures, for example, identifies files in the progression which the content server was unable to pre-position (download), thereby allowing "gaps" in the continuum while still reporting a discrete position along the event continuum for the ordering category to indicate pre-positioning status. The pre-positioning mechanism also resolves different versions of a catalog which propagate to the content servers and the management server in generating the status. Over time, changes occur in the catalog of a particular channel. Such changes may not propagate to all content servers at the same time. Accordingly, status reporting accounts for different versions of the channel catalog when correlating the pre-positioning status reports with a particular version of the catalog which is available.

For example, a particular CDN contains sales information for a sales force of a particular corporation. Two channels are set up; one for east coast sales and one for west coast sales. The east coast channel contains sales and marketing files pertinent to the eastern sales offices and customers, and the west coast channel contains sales and marketing files pertinent to the west coast sales offices and customers. In each channel, a set of content servers, or channel server set, is assigned to store the respective files in the channel. These channel server sets are located in Boxboro, Mass. for the east coast sales channel, and in San Jose, Calif. for the west coast sales channel. Therefore, the CDN disposes the content servers in proximity to the users expected to request the files. Accordingly, remote origin servers and/or those over high latency lines download, or pre-position, their respective content on the content servers of each channel server set. Such pre-positioning ensures that users do not encounter delays when attempting to access the files in the channel.

Each pre-positioned file is associated with an event number in the catalog. The event number is an increasing ordering of the files to be downloaded to the content servers of the channel from an origin server. Pre-positioning is an ongoing process as the content server adds active files and removes inactive files. Therefore, the current event number, along with a list of active files in each channel, indicates the current set of files pre-positioned at the content server. Accordingly, the replication status report contains the most recent event and therefore, the corresponding file for which pre-positioning is complete. Since the events are an ordered list, the current channel manifest includes all files corresponding to events up to the events indicated in the current replication status report.

In further detail, the system of the present invention facilitates responses to operator initiated queries for replication status by reporting replication status of media content in a content delivery network (CDN). A content server employing the system of the present invention identifies a set of content items for replication at a content server and enumerates the content items received at the content server from the identified set of content items. The replication status reporter then reports the enumerated content received by indicating a progression threshold in the identified set corresponding to the enumerated content.

A status reporter in the content server subdivides the identified set of content items into the ordering categories indicative of a subset of the identified content items and reports the progression threshold for each ordering category. The ordering categories are further indicative of a priority for a subset of the content items from the identified set of content items to be stored at the content server. Organizing the events according to the ordering category avoids occurrences such as a slow or erratic link causing a large number of error list entries in the replication status report, for example, or allows the status reporter to aggregate a large number of lower priority files in a separate report.

The reports further include an incomplete portion indicative of identified content items within the progression threshold which have not yet been received at the content server. Such an incomplete portion, or error list, avoids a single troublesome file from interfering with reporting of pre-positioning of later files in the event list.

The management server further provides that reporting the pre-positioning of media content includes generating a replication status report including the progression threshold at each of a plurality of content servers, transmitting each of the replication status reports to the management server, and aggregating the replication status reports at the management server. An operator, therefore, employs a single management server to query a plurality of servers supporting a particular channel. Various queries and information requests are therefore available to the operator by aggregating the replication status reports in response to an operator status query from a management status GUI at the management server.

The replication, or downloading of files to the content servers, in a particular configuration, involves fetch rules, in which the content server receives the content items according to the fetch rules, in which the fetch rules are indicative of an order in which to receive the content items. The fetch rules specify, for example, resolution of multiple simultaneous origin servers, timeouts for failed and/or slow links, and accommodations for very large files.

In an alternate configuration, the replication status report further includes a present list indicative of content items not included in the set of content items corresponding to the progression threshold and which have been received at the content server from the origin server. Similar to a complement of the error list, such a present list allows the content server to pre-position files well in advance of the order of the events on the event list, yet without enumerating all the intervening files as awaiting pre-positioning.

The management server further includes a reference catalog which includes, for a particular channel, the content items expected to be presently in the channel, i.e. if all events in the catalog are complete. The management server employs the reference catalog for interpreting the replication status reports. Typically, the management server generates the reference catalog by querying at least one of the content servers and determining a most recent version of the catalog from a content server, such as a root server or other server likely to have the most recent version, to employ as a reference catalog. The reference catalog employed by the management server, like all catalogs, has incrementing event numbers, which correspond to the content items most recently included in the reference catalog. The incrementing continuum of events, therefore, indicates how "up to date" a particular catalog is relative to other catalogs in the channel.

Typical replication status reports may be in response to a particular query, in which the management server receives an operator status query corresponding to a particular channel, in which the management server aggregates a global status report from the replication status reports sent by each content server. Alternatively, the management server may compute a progression threshold corresponding to a particular content item. Each server also periodically routinely generates replication status reports and sends them to the management server so that the management server remains current. The management server identifies a reference catalog of content items expected for replication at the content server, and compares the content items in the reference catalog to the progression threshold. The management server then computes, as a result of the comparing, whether deterministic status may be determined from the reference catalog and the progression threshold.

The management server, therefore, performs a check to determine if the management server has a sufficiently recent version of the catalog to perform the status query in a deterministic manner, or if it may be subject to false negative and false positive results due to intervening events not encompassed in the catalog. Accordingly, such comparing further involves determining the most recently received event (i.e. event number) for the content items in the reference catalog, and determining if the highest event number in the reporting content server's catalog is greater than the reference catalog highest event number. If the highest event number for the content server catalog is higher than the reference catalog, then the reference catalog is stale and cannot be considered to be deterministic. Otherwise, the progression threshold in the replication status report for each of the ordering categories is employed to determine the global status report.

The management server interprets such event numbers by determining, for each ordering category in the channel, a corresponding progression threshold, and comparing the progression threshold to the reference catalog of content items which should, ideally, occupy the channel. The management server computes, if the progression threshold is less than or equal to the highest event number, the replication status for the channel, which indicates the status of the individual content items corresponding to the events. Alternatively, the management server may compute, indeterminability of the replication status due to the reference catalog not being current. In such an instance, the management server determines where a current reference catalog resides and retrieves the current catalog to bring the management server up-to-date.

In another implementation, the replication status reports are further operable to include absolute and range references along a continuum, the progression threshold indicative of a progression on the continuum.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 1B is a block diagram of a content server as in FIG. 1A in greater detail.

FIG. 6 is an exemplary catalog of events.

FIG. 7 is an example of a replication status report based on the catalog of FIG. 6 and generated by the replication status reporter of FIG. 5.

FIG. 8 shows an alternate configuration depicting different versions of a catalog propagated to content servers.

DETAILED DESCRIPTION

Figure 1A:
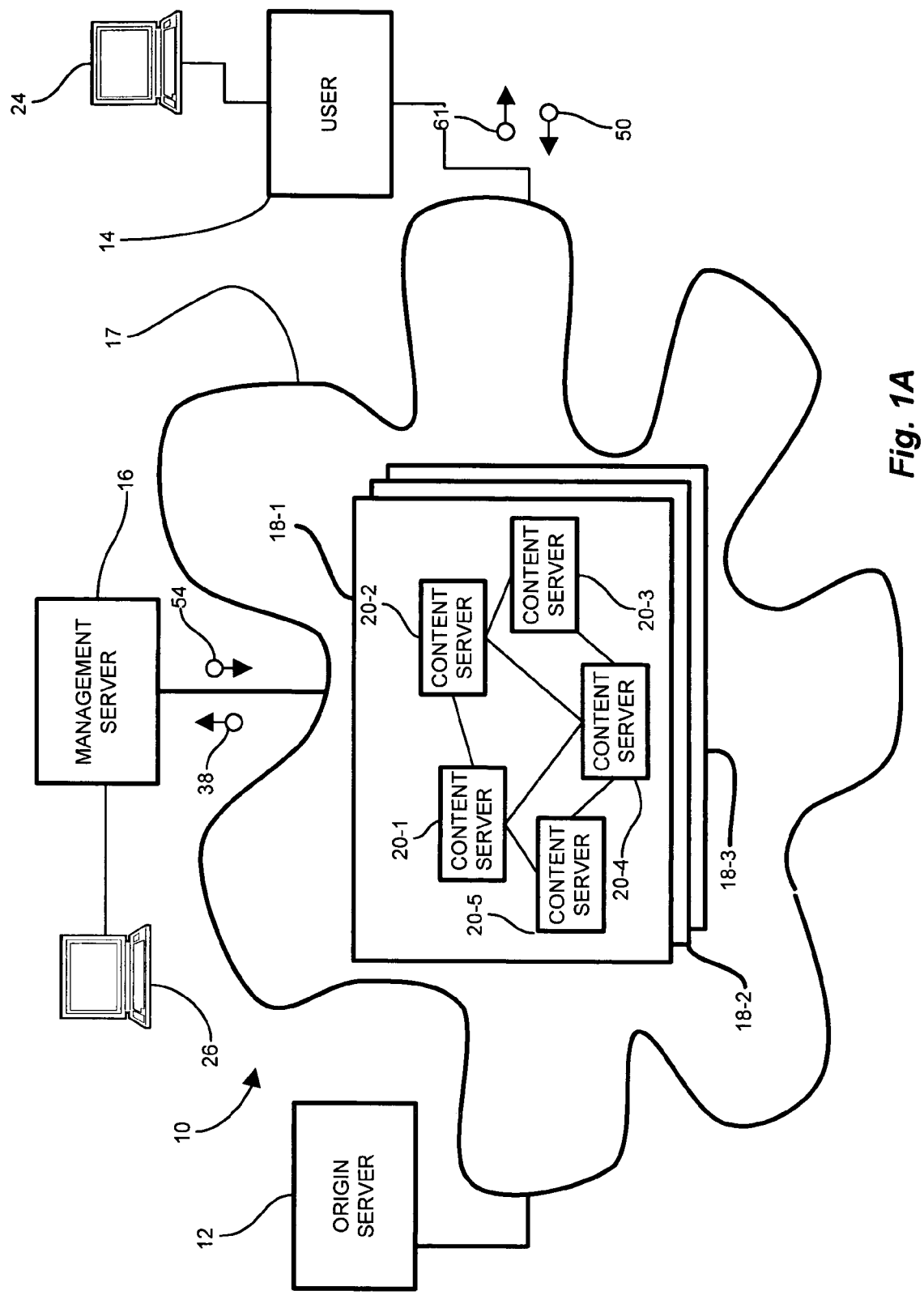
FIG. 1A is a context diagram of a communications system which is suitable for use with the system of the present invention employing a replication status reporter as defined herein.

Configurations of the invention provide for a replication status reporter which identifies an ordered list of events corresponding to content items (files) for replication (pre-positioning) in a content delivery channel, and determines a point of progression along a sequence (progression threshold) represented by the ordered list of files. In each channel, the content items correspond to a set of events denoting this sequence. The servers in a CDN channel receive these files according to a set of rules, which define the set of channel files as a series, or continuum, of these ordered events (catalog). Further, the files in a particular channel change over time, causing new files to become active and others to become inactive. A content server obtains files from an origin server (or servers) generally according to a channel list of files, and augmented by the rules to pre-position more critical files first and avoid unnecessary delays due to unavailable files, transmission errors, bottlenecks, etc.

Therefore, the content items in the channel are defined in the catalog. The catalog stores events pertaining to files, such as adds, deletes, and priority (ordering category) modifications. In other words, a catalog lists what should happen with respect to the content items in the channel. However, it does not alone indicate status. The catalog is a list of events, in which each entry has an event number that reflects when it was added to the catalog, i.e., later entries have higher numbers than earlier ones. The catalog does not indicate what has actually happened, i.e., which files have been pre-positioned, and which have not. Information about what pre-positioning has happened is separate from the catalog.

The replication status reporter, as discussed herein, further subdivides the files in a channel into ordering categories according to priority groups and the origin servers from which the files emanate. Alternate selections and criteria for ordering categories are selectable within the scope of the invention. A progression threshold within each of the ordering categories indicates the progression of files pre-positioned, or downloaded, for the set of files in that ordering category. Since the set of files is an ordered sequence, an indication of the progression in the sequence, rather than an exhaustive list of files, identifies the files which the content server has been successful in pre-positioning. In this manner, a report including the ordering category and the current file within the sequence indicates that the content server has been successful in pre-positioning previous files in the sequence and that successive files in the sequence are still pending. Further, an error list of files failing pre-positioning, due to network failures, for example, identifies files in the progression which the content server was unable to pre-position (download), thereby allowing "gaps" in the progression while still reporting a discrete position along the event continuum for the ordering category to indicate pre-positioning status.

As indicated above, pre-positioning requires an indication of what content is in the channel. This information resides in a catalog that lists the files currently in the channel. The catalog changes on a regular basis as new files are added to it and old files are removed.

The catalog stores information about all "active" files: all files that are currently considered to be in the channel. Each file has an associated event number. This number is assigned to it when it is added to the catalog; files added later have larger event numbers (e#) than those added earlier.

Thus a catalog contains a set of pairs:
<file-info, e#>

The file-info includes the file name and any other necessary information. Most significantly, it contains information about where to fetch the file, and how to order this fetch relative to the fetches of other files in the catalog.

The aforementioned status reports, therefore, propagate information about how the individual content servers are "keeping up" with their catalogs. Servers assigned to a channel report their replication status for that channel by sending a status report to the management server. For the approach to be practical, the status report must be small.

As mentioned, catalog entries contain information about the fetch order for files in the catalog. This information is interpreted by content servers to determine when to fetch the file. As a basic rule, servers will fetch files in their event order, i.e., files added to the catalog earlier will be fetched before those added later. But this basic rule is likely to be combined with other rules. For example, suppose files in the channel are coming from two different "origin servers" (web sites that hold content), and that in addition there are three priority levels. Then a content server might fetch independently from the two origin servers, but for files coming from the same origin server, it fetches by priority level, and within each priority level, it fetches by event number.

Content servers will carry out these rules as they fetch the files. If they have trouble fetching a particular file, however, they will skip over it and go on to the next one in order. For example, the content provider might add a file to the catalog before that file exists at the origin server; if the content server is unable to fetch the file, it skips over the file, and returns to it later.

If there were just one origin server and no priority levels, so that fetching were done entirely by event number, we could report the entire status with just one pair:
<e#, error-list> where e# is an event number and error-list is a list of event numbers. The meaning of this pair is the following: no files with event number greater than the stated e# have been fetched. All files up to and including that e# have been fetched, except for those whose event numbers are listed in error-list. This scheme won't work well once there are other ordering constraints, however. For example, a server might have fetched the files with event numbers 3, 5, and 9 because these are at the top priority. And it might also have fetched files 1 and 7 because these are at the second priority. If we try to present this information using one pair, we'll have to list numbers 2, 4, 6, 8 in the error-list, i.e., the error-list can become very long.

The status reports employ "ordering categories" to keep the reports small. An ordering category identifies a set of files that are fetched in event order, e.g., if there is just one origin server, but several priorities, then there would be a separate ordering category for each priority. If there were two origin servers and three priorities, then there would be six ordering categories, since we fetch per origin server and per priority. Therefore the replication status report is a set of triples (tuples):
<o, e#, error-list>

Here o identifies an ordering category, e# is the event number of the highest fetched file in that category, and error-list contains the event numbers of all files in that category whose event number is less than e# and that haven't been fetched.

The ordering category o could be a description of that category. E.g., if there were two origin servers S1 and S2, and three priority levels, p1, p2, p3, then the ordering category for S1 at priority two could be described as <S1, p2>. Alternatively, we could preassign numbers to the categories, so that, e.g., the number 2 stands for <S1,p2>.

The size of the report depends on the number of ordering categories. It is unlikely to be large in any deployed system for two reasons: 1) even if a large number of choices are offered, e.g., 100 different priority levels, in practice only a small set of ordering categories will be used; 2) status reports aren't needed for categories that aren't used.

FIGS. 1A and 1B are a context diagram of a communications system which is suitable for use with the present invention employing a replication status reporter as defined herein. Referring to FIG. 1A, the network 10 includes a content delivery network (CDN) 17 including a plurality of channels 18-1-18-3, each channel having at least one content server 20-1-20-5. The network 10 also includes an origin server 12, at least one user 14, and a management server 16.

Referring to FIG. 1B, the content server 20 is shown in greater detail. Each content server 20 has a version of the catalog 22, and a high event number 46 and status information 44 indicating at least one current event number (generally one for each ordering category, described further below), corresponding to the events in the catalog. The content server 20 also includes a status reporter 32 for generating and sending the replication status reports.

The CDN 17 connects to the origin server 12, the user 14, and management server 16. The content servers 20-1-20-5 interconnect the CDN 17 to the other content servers 20-1-20-5. The CDN 17 is operable to provide media content via the user PC 24 or other user interface device, connected to the user node 14. Similarly, a management station 26 provides interactive access to the management server 16, also described further below.

In operation, the content servers 20-1-20-5 operate to maintain the CDN 17 by storing and delivering media content to the user 14. Such media content may include, for example, video on demand, corporate sales and marketing information, and musical (audio) tracks. A variety of other media are also possible. The content servers 20-1-20-5 collectively support the respective channel 18n of media content. In particular implementations, the media items (files) listed in the catalog 22 are distributed among the content servers 20-1-20-5 (20 generally) as indicated by the file info field, discussed further below. Such a channel 18 is a collection of media items 25, or files, operable for the CDN 17 to provide, or serve, to the user 14.

The catalog 22n is a description of what content is in a channel. It indicates to the content servers 20n which files 25 they need to pre-position. However, the catalog does not include information about what files are actually pre-positioned (i.e. copied from the origin server 12 to the content server 20). By associating event numbers with each catalog 22n (22 generally) entry, and ordering the events according to priority and origin server (i.e. ordering categories), pre-positioning status (i.e. catalog progress toward copying each file 25) is determinable within a given ordering category merely by identifying the last event completed.

Each content server 20 maintains this progress in the form of a replication status report (38, FIG. 7, below), indicative of the relative progress within each priority and from each origin server. Since the management server 16 also has the same or substantially similar version of the catalog 22, it need only identify the relative progression of pre-positioning for each content server 20n. Such information is maintained and transmitted in the form of a replication status report 38, now described in further detail.

As indicated above, the catalog 22 acts as a contents list, or history list, of content items that should be stored and/or revised in the channel 18. However, each content server 20n independently maintains its own version of the catalog 22 and status of media content items 25 replicated therein. The status information 44 and highest event number 46 correspond to the catalog 22 retained at each content server 20, and indicate the current status and the highest event number known for this catalog 22. The highest event number 46 indicates the most recent event number known to this content server 20, which determines whether the reference catalog 37 at the management server 16 is deterministic with respect to determining replication status, and is discussed further below. In other words, if the reference catalog 37 is stale, i.e. lags the catalog 22 at the content server 20, a complete status report cannot be obtained without updating the reference catalog 37, as will be shown in FIG. 8 below.

A user 14 who desires to receive media content from the channel 18 issues a request 50 to the channel 18, which one of the content servers 20n receives. The content server, 20-3, for example, consults the catalog 22 to determine if the requested item is available from among the media content items 25. The requested item 25 is available when the content server 20-3 completes pre-positioning, as described above. If the requested item is available, the content server 20-3, for example, retrieves and transmits, or delivers, the requested content item 52 to the user 14.

Figure 2:
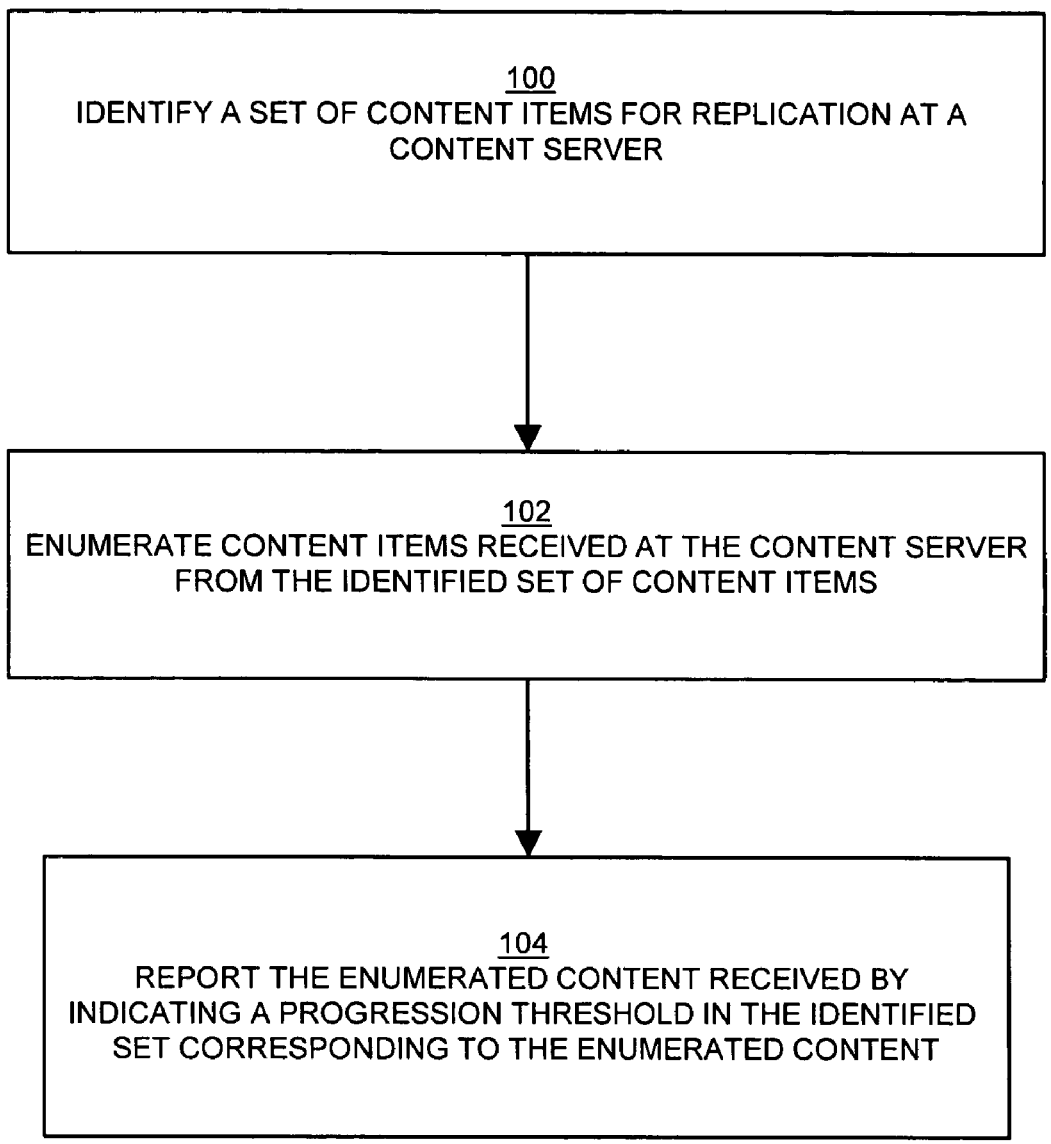
FIG. 2 is a flowchart of reporting replication status via a replication status reporter as defined herein.

FIG. 2 is flowchart of reporting replication status via a replication status reporter as defined herein. Referring to FIG. 2, the method for reporting replication status of media content in a channel 18 by the replication status reporter 32 is shown. At step 100, each content server 20 identifies a set of content items 25 for replication at the content server 20-1-20-5, such as the files included in a channel 18. The set of content items 25 takes the form of a catalog 22 of events, each event having an event number (42d, FIG. 4 below). Each content server 20n processes the events 42d in the catalog 22 in order according to priority (42c, FIG. 4 below) and other rules (not specifically shown). As it processes the events it records what happened, e.g. it records that it successfully pre-positioned file F1 but stepped over F2.

Each content server 20n maintains its own copy of the catalog 22 in an ongoing manner by periodically receiving an updated copy of the catalog 22 along with the corresponding event numbers 42d. It can obtain this from a designated origin server 12, or from a root server 20 whose job is to maintain the catalog 22 by learning about changes in the content, or by communicating with some other content server 20. Each content server 20n also maintains the status information about what files it has pre-positioned—i.e. the outcome of processing, or attempting to process, the events in the catalog.

At step 102, each content server 20n enumerates the content items 25 received at the content server 20n from the set of content items 25 which the content server 20n is to pre-position. As the catalog 22 includes both completed and pending events affecting file additions, deletion, and updates, the content server 20 traverses or otherwise processes the catalog 22 and determines the current status of each active content item 25 in the catalog. Such enumeration commences when the content server 20n is ready to produce a report, either because it was asked for one by the management server 16, or each time it processes another event in the catalog, or because of a routine, periodic report sent to the management server 16. The content server 20 determines for the content items 25 currently in the channel 18 which have been received and which have not been received. Note that inactive items 25 occurring in the catalog 22 may be pending a permanent deletion, for example, and may undergo other handling to avoid burdening the enumeration of active files.

At step 104, the content server 20 reports the enumerated content received by indicating a progression threshold in the identified set corresponding to the enumerated content. Since the events in the catalog 22 occur in a sequential order, the progression threshold need only identify the most recent event corresponding to a file it has received. Accordingly, the content server 20 produces the status report so that for each category it reports a threshold so that all files with associated event numbers 42d less than that number are present, unless listed in the error (absent) list (described further below with respect to FIG. 7). Using the progression threshold according to the last successful event, the management server 16 maps this event to the known pre-positioning order of the channel 18, based on the catalog 22, to determine which pre-positioning events are complete, and hence which files (content items) 25 are pre-positioned. In this manner, a complete indication of pre-positioning results from comparing the current pre-positioning threshold, or point of progression along the events, to the complete list. Events prior to the current event are taken to represent successful pre-positioning events, and subsequent events construed as awaiting pre-positioning. Further, the content server 20 indicates exceptions to the event ordering in an error list and file present lists, discussed further below.

Before discussing computation of the status report in further detail, following is a description of how the management server computes replication status assuming, for example, that the ordering category for a file is set when it is placed in the channel and does not changes after that; further below is discussed how to handle category changes.

A content server responds to such a request with its current replication status. It could compute this by going through the catalog and checking the status of each file. But a better way is to keep a running tally. Each time a file is fetched, the event number at its ordering category is advanced to be its event number, and if any files in that ordering category but with lower event numbers were skipped to get to this file, their numbers are added to the error-list, which will be discussed further below.

The management server computes the replication status of a particular file (f) by looking f up in the reference catalog. This allows it to determine the associated event number and also the ordering category for that file. Next the management server uses the ordering category to determine the status report tuple that covers that file. It does this for each content server.

The file f is present at a content server if its event number is less than or equal to that appearing in the selected tuple (progression threshold), and additionally if its event number is not listed in the error-list. Based on this information, the management server can provide the operator with the required information, e.g., the percentage of content servers that hold the file, or a list of content servers that don't hold it.

In particular implementations, the management server may not be able to communicate with all the content servers for that channel. For those missing servers it can use old status information (if it has this), or it can assume they don't have the file, or it can indicate that the file status is "not-known" at such content servers.

It is possible that when the root server recomputes the catalog, it discovers that the ordering category of some file has changed. Since replication status is reported per ordering category, processing accounts for such inter-category events. For example, consider a file f that moves from priority p1 to a higher priority p2. Because f used to be low priority it hasn't been fetched yet. Furthermore, suppose the content server C issues a status report before it learns about the change in priority. Therefore it will cover the status of f in its tuple for p1, not its tuple for p2.

However, without some additional mechanism, the management server will look at C's tuple for p2 to determine the replication status of f. And it is possible that f's event number is less than the e# in the tuple for p2 because fetching is ahead for p2 since it is higher than p1. And of course f's event number won't appear in the error-list of p2's tuple, since C considers f to have priority p1.

There are at least two ways to avoid this problem. Both expect that status reports include the latest event number known to their sender. The first approach is to change a file's event number whenever there is a change to its ordering category. Thus an entry for file f that used to have event number e1 will now have a later event number e2.

Renumbering avoids the problem described above. None of the tuples sent by C will contain an e# greater than the new event number of f, since C hasn't heard about this new number yet. Therefore the management server will not conclude that f is present at C by mistake. Further, the management server will know that it cannot provide accurate information for C about f, since f's event number is larger than the largest number known to C. So it could report that f isn't at C yet, but it could instead report f's status as not known for C, or it could ask C for more recent information.

However, we still haven't entirely solved the problem, because it is also possible for a content server to report more recent information than what the management server has heard from the root server. This case is also a problem, because the management server will look for the information about f at its old priority level, not its new one, and as a result could come up with the wrong status. This problem is easily avoided, however. If the content server receives a report from a non-root content server that contains a larger event number than what was reported by the root server, it requests additional information from the root server before processing the non-root server's report.

In an alternative implementation, the approach is to keep a list of changes and use them to figure out what to do. Each time there is a change for some file f, the root places a "change record" in the "changes log". This change record has its own event number, and it records both the previous information for f and the new information. This approach requires the management server to request a copy of the change log from the root. The change log allows the management server to figure out what to do, For example, when C reports based on the previous ordering category for f, the management server can tell that this is happening because the highest event number reported by C is less than the change record for f. Therefore the CDM knows that it must use f's previous ordering category when looking it up in C's report. Also if C reports an event number higher than what the management server heard from the root server, the management server will know to use the old ordering category for f in the root's status report but the new one for C's report.

The use of the changes log allows the management server to know more about what is going on, because it is able to compare information from two different ordering categories. But it requires the use of an extra data structure; this data structure is avoided with the renumbering scheme, discussed further below. It will be apparent to those of skill in the art that the change log arrangement discussed above is applicable to the invention defined in the present claims.

Figure 3:
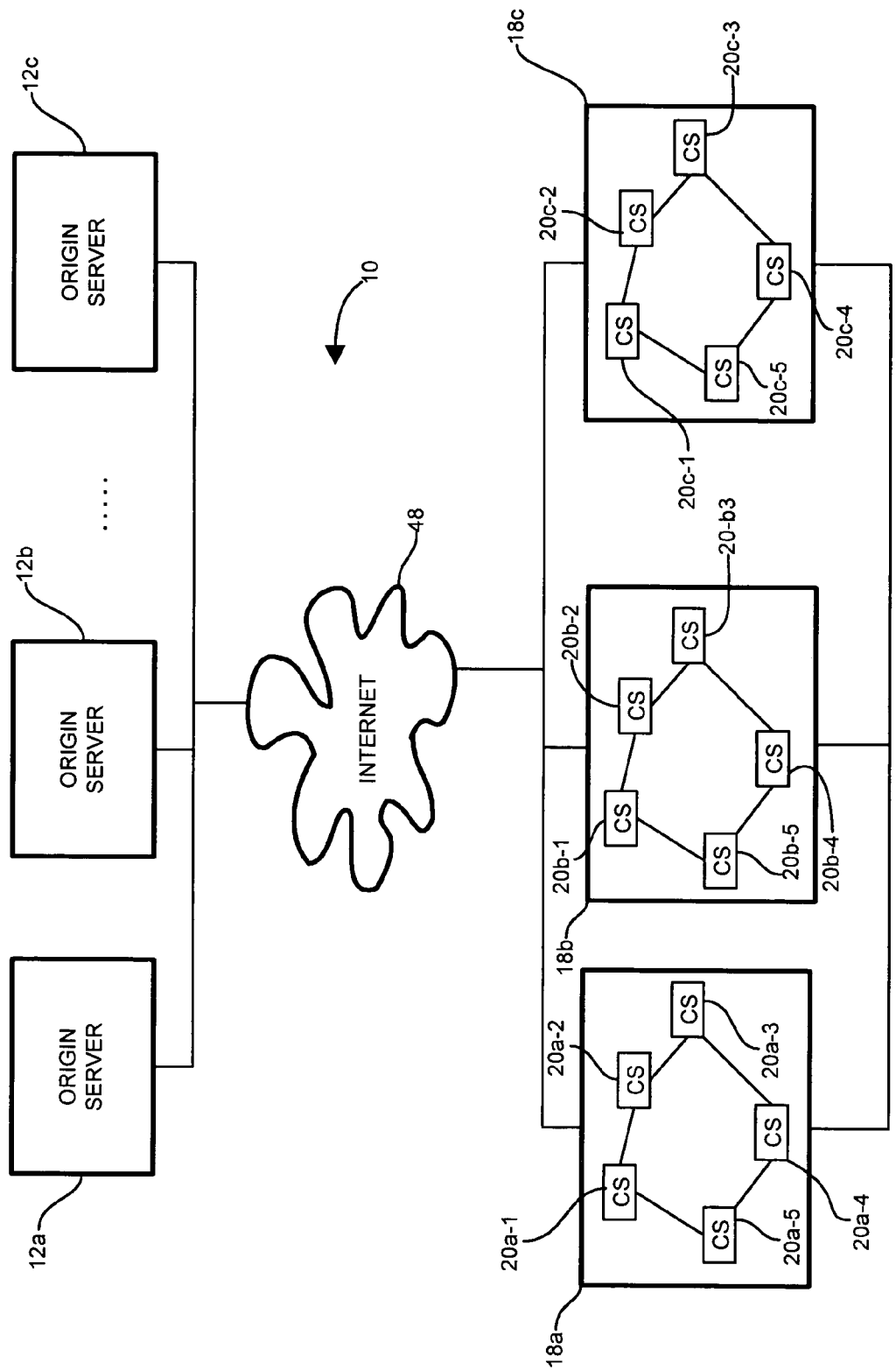
FIG. 3 is a block diagram of a plurality of CDNs employed in the system of FIG. 1.

FIG. 3 is a block diagram of a plurality of channels 18n in the CDN 17 employed in the communications system of FIG. 1. Referring to FIGS. 1 and 3, the plurality of channels 18a-18c are shown. In general, a CDN 17 includes one or more channels 18n, each of which encompasses a plurality of content servers 20n. Therefore, a particular channel 18a-c includes a set of content servers 20n. A particular content server 20n may, in actual implementations, support multiple channels 18n. However, for illustrative purposes, each of the channels 18n is shown to include an exclusive set of content servers 20n. For example, the channel 18b includes content servers 20b-1-20b-5. In alternate embodiments, a particular content server 20n may be part of one or more channels 18n, i.e. the same content server may operate as content server 20b-2 for channel 18b and as content server 20c-4 for channel 18c, if it has computing resources to support both channels 18b and 18c.

The exemplary network 10 also includes a plurality of origin servers 12a-12c (12n generally), a public access network such as the Internet 48, and the management server 16 (FIG. 1). Each of the content delivery networks 18n further includes a plurality of content servers (CS) 20a-20c (20n generally) and the catalog 22. A root server 20n-1 typically maintains the catalog 22a-22c (22n generally) on behalf of the remaining servers 20n-2-20n-5, as shown. However, recall that each content server 20n maintains its own catalog 22, but may communicate with the root server 20n-1 for catalog updates.

Each of the channels 18n connects to the plurality of origin servers 12a-12c (12n generally) via the Internet 48. Each of the content servers 20n also interconnects within each respective channel 18n, and to the catalog 22n. The management server 16 connects to each of the channels 18a-18c and is operable to send queries 54 and to receive replication status reports 38.

Figure 4A:
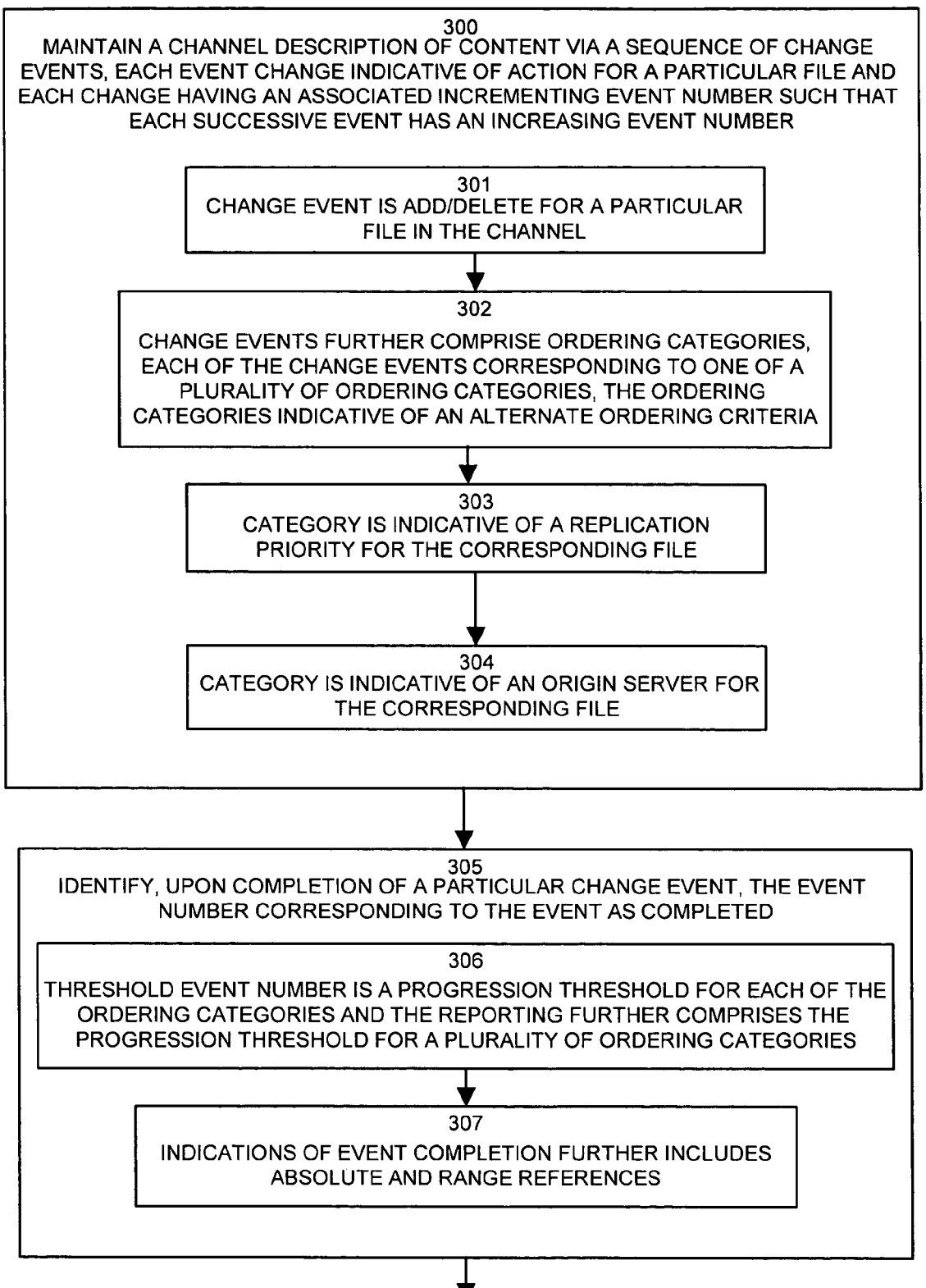
FIGS. 4A and 4B are flowchart of gathering and reporting replication status in the system of FIG. 3.
Figure 4B:
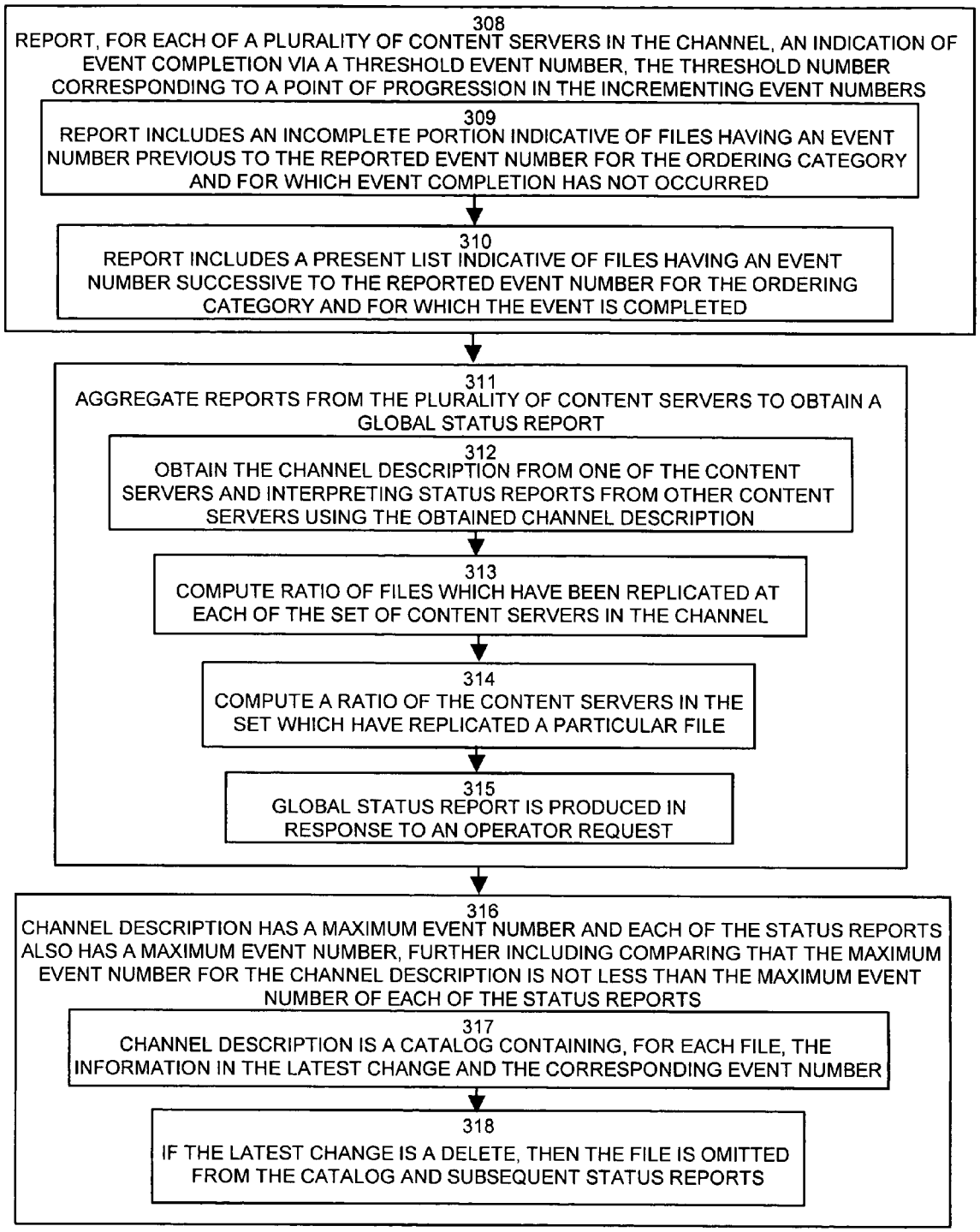

FIGS. 4A and 4B are a flowchart of gathering and reporting replication status in the system of FIG. 3. In an information services network such as the content delivery network of FIG. 3, having channels delivering content items, in which the content items are served from content servers, the channel items vary over time. The content items are replicated, i.e. downloaded, from origin servers to the content servers that serve the channel. In a particular configuration, the method for reporting replication status of the content items from the group of content servers in such a channel, by way of example only, includes the following steps.

Referring to FIGS. 4A and 4B, at step 300, each of the content servers 20n maintains a catalog 22 for channel 18 describing its content via a sequence of changes events, in which each event change is indicative of action for a particular file (i.e. content item 25) and each change having an associated incrementing event number such that each successive event has an increasing event number over the previous event number. At step 301, the change event is add/delete for a particular file 25 in the channel 18. The change events include operations which manipulate the content items. Other types of change events include events for changing the priority of a particular content item or set of content items, thus changing the ordering category. At step 302, the change events further include ordering categories, each of the change events corresponding to one of a plurality of ordering categories, in which the ordering categories are indicative of an alternate ordering criteria. Therefore, events which change the priority of a file may place the file in a different ordering category.

At step 303, the ordering category indicates a replication priority for the corresponding file 25, and at step 304 the ordering category indicates an origin server for the corresponding file 25. In the particular exemplary arrangement shown, the ordering category indicates both the priority and the origin server for a particular content item.

At step 305, the content server 20, upon completion of a particular change event, identifies the event number corresponding to the completed event. As indicated above, the event numbers follow an incrementing sequence indicated by the event number. At step 306, a threshold event number is a progression threshold for each of the ordering categories. The replication status report includes the progression threshold for each of the plurality of ordering categories, and, at step 307, include absolute and range references to the content items 25. Each content server 20 therefore identifies progress along completion of the events in the catalog via the progression threshold.

At step 308, each of the content servers in the channel reports, by sending a replication status report, the respective progression threshold as an indication of event completion via a threshold event number. As indicated above, the threshold number corresponding to a point of progression in the incrementing event numbers. Accordingly, the management server 16 is operable to identify merely from the progression threshold where a particular content server 20*n* is with respect to all events in the catalog, since the event numbers occur sequentially.

At step 309, the replication status report 38 further includes an incomplete list indicative of files 25 having an event number previous to the reported event number for the ordering category and for which event completion has not occurred. At step 310, the replication status report 38 further includes a present list, the present list indicative of files 25 having an event number successive to the reported event number for the ordering category and for which the event is completed.

At step 311, the management server receiving the replication status reports aggregates the reports from the plurality of content servers to obtain a global status report. At step 312 the aggregating includes obtaining the channel description, or catalog, from one of the content servers and interpreting status reports from other content servers using the obtained channel description. Therefore, the management server 16 obtains a channel description to employ as a reference catalog 37 for interpreting the replication status reports 38 from each of the content servers 20*n*. As will be discussed further below with respect to FIG. 8, the management server 16 obtains a catalog that is sufficiently recent (i.e. not stale) such that it is viable to interpret the received replication status reports 38 using the reference catalog 37.

At steps 313-315, the management server determines other information which may be queried. At step 313, aggregating the reports further includes computing a ratio of files which have been replicated at each of the set of content servers in the channel. At step 314, aggregating the reports further includes computing a ratio of the content servers in the set which have replicated a particular file. At step 315 global status report is produced in response to an operator request, typically an inquiry for replication status regarding the entire channel 18.

As indicated above, a staleness check validates the accuracy of the replication status report. At step 316, the channel description, has a maximum event number indicating the highest event number received. Each of the status reports from the respective content servers also has a maximum event number. Generating the global status report includes comparing that the maximum event number for the channel description is not less than the maximum event number of each of the status reports. At step 317, the channel description is a catalog containing, for each file the information in the latest change and the corresponding event number. The catalog is, therefore, an ordered list of ongoing events for files 25 in the channel, and indicates what files and the corresponding priorities and origin servers the channel should contain. The replication status reports 38 indicate progression towards satisfaction of all events in the catalog. At step 318, if the latest change event is a delete, then the file is omitted from the catalog 22 and subsequent status reports 38. Therefore, deleted files do not continue to occupy space in subsequent processing for computing the global status report.

Figure 5:
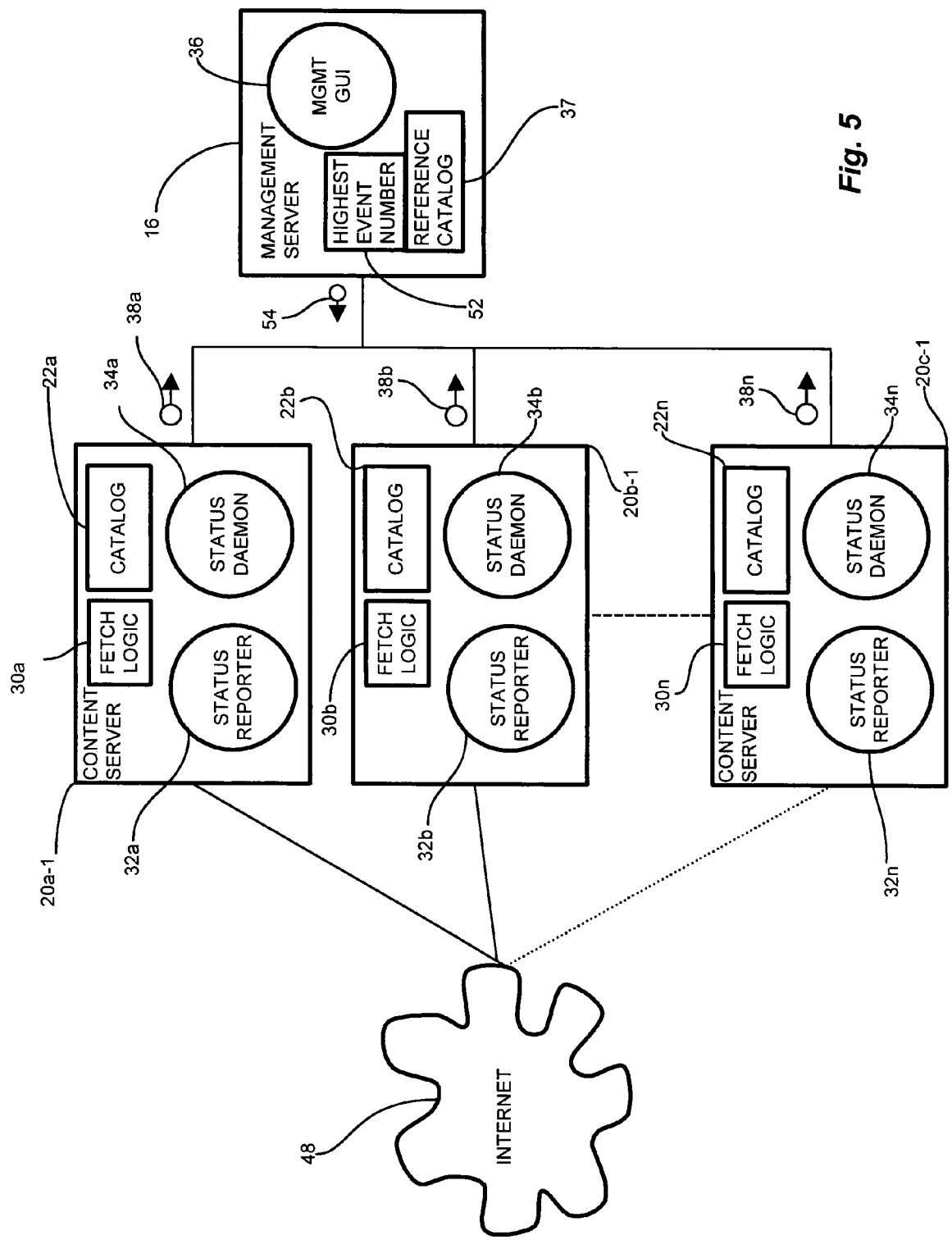
FIG. 5 shows a plurality of content servers as in FIG. 3 using the replication status reporter.

FIG. 5 shows a plurality of content servers as in FIG. 3 using the replication status reporter 32. Referring to FIG. 5, the content servers 20*n* each contain a catalog 22*n*, a replication status reporter 32*n* component, a status daemon component 34 (34*n*, generally) and fetch logic 30*n*. The management server 16 further includes a management graphical user interface (GUI) 36, accessible by an operator via the operator console 26. The management server 16 is operable to receive the replication status reports 38*n*. The management server 16 also has a reference catalog 37, for each of the channels 18 which it oversees, including the list of files in each channel 18 which the content server 20*n* is supposed to make be available. Since the status report sent by the status reporter 32 is relative to the current catalog 22, or list of events, known to the particular server 20*n*, the propagation and coordination of the reference catalog 37 and the channel to which it corresponds affects the processing of the replication status reports 38.

Each of the servers 20*n* connects to the management server 16 for management queries by the management GUI 36. Each of the content servers 20*n* also connects to a plurality of origin servers 12*a*-12*n*, as described above, for receiving the content items 25 via the Internet 48 or other transport medium. The fetch logic 30*n*, status reporter 32*n*, and status daemon 34*n* are operable to manipulate the catalog 22*n* for purposes of pre-positioning (downloading) files 25 from the origin servers 12 and reporting to the management server 16.

In operation, the server 20*n* fetches files 25 from a particular origin server 12 according to the fetch logic 30*n*. The fetch logic 30*n* includes rules indicative of the files 25 which the server 20*n* is to fetch, a fetching order, and conditional branches such as dealing with unavailable files 25, inaccessible links, and other conditions. In particular, the fetch logic determines the fetching order according to priority, which also may be used in specifying the ordering category. For example, the fetch logic may indicate skipping a certain file if it is unavailable, skipping a group of files accessible over a known suspect link, and adjusting fetching order of files based on file size. Other rules and fetching optimization strategies will be apparent to those skilled in the art.

The status daemon 34$n$ observes file operations during retrieval from the remote origin servers 12$n$, for tracking completion of pre-positioning events from the catalog 22$n$. The catalog 22$n$ is an event list of all file additions, and other content item activities, such as deletions and revisions, which the catalog 22 stores according to the event number, described further below. Event numbers follow an increasing order of the pre-positioning events relating to content items 25. Since the catalog 22$n$ is an ordered list, the event number increases with each successive event such that each event number is unique, and a collective aggregation of the completion status of all events (i.e. whether the event in the catalog has completed pre-positioning) indicates the current pre-positioning status of a particular content item 25 (file). In this manner, the catalog 22$n$ may be thought of as a history affecting the content of the channel 18$n$ up to and including the pre-positioning of the file indicated in an event number. The collective aggregation of the catalog 22$n$, including adds, deletes, updates, and modifies, therefore indicates the current content, or manifest, of the particular channel 18$n$ corresponding to this catalog 22$n$.

The status reporter 32$n$ is in communication with the catalog 22$n$ for generating replication status reports 38$n$ for transmission to the management server 16. The status reporter 32$n$ is operable to traverse the catalog 22$n$ and determine a current pre-positioning status for files 25 according to the event number. Further, as the events correspond to the origin servers 12$n$ from which they emanate, and to priorities specified by the fetch logic 30$n$, the status reporter 32$n$ is operable to generate status reports 38$n$ indicative of each of the origin servers 12$n$ within a particular ordering category (i.e. priority and origin server). Therefore, for a set of content items 25 in a particular ordering category, that is, having the same priority and originating from a particular origin server 12$n$, the status reporter 32$n$ determines the most recent event number, and therefore the current set of content items 25 present at the server 20$n$, since each of the previous events having event numbers previous to the current event number have undergone pre-positioning. Accordingly, the status reporter 32$n$ determines, based on the event number and the corresponding file info, whether a particular file or set of files 25 has completed pre-positioning at a particular content server, and therefore whether they are ready for publication of availability (i.e. completely pre-positioned at all content servers 20$n$) and access via the channel 18.

The management server 16 is in communication with the status reporter 32$n$ for receiving replication status reports 38 and in response to an operator query 54. Using the operator station 26, the operator generates a query 54 via the management GUI 36 for a set of servers 20$n$, each corresponding to a particular channel 18. Queries typically target the status of a particular channel. Additionally, such queries 50 may include, for example, whether a certain file 25 is available via pre-positioning at a particular server 20$n$, the present completion status of content items 25 for pre-positioning at a particular content server 20$n$, or the percentage of servers 20$n$-1 having completed pre-positioning for a particular channel 18.

The management GUI 36 transmits the query 54 to each of the status reporters 32$n$ applicable to the query. The corresponding status reporter 32$n$ at each server 20$n$ generates and returns a query response including the replication status report 38$n$ in response to the query 54. Since the replication status reports 38$n$ for a given server 20$n$-$a$ need only indicate the last event corresponding to a pre-positioning operation, the replication status report 38$n$ occupies relatively little memory, and accordingly, consumes little bandwidth. Further, since the most recent event can be determined as the content server 20$n$ does pre-fetching, the server 20$n$ need expend minimal processing resources in order to allow the status reporter 32$n$ to generate the replication status reports 38$n$.

In this manner, the status reporter 32$n$ does not need to manipulate the entire manifest of content items 25 corresponding to the current catalog 22$n$ and channel 18. The status reporter 32$n$ need only report the last event corresponding to a pre-positioning operation. The status reporter 32$n$ may generate such a status report 38$n$ at regular periodic intervals, upon demand from the management server 16, or both. For example, the status reporter 32$n$ may generate and send status reports 32$n$ to the management server 16 every 15 minutes, such that the management server 16 has an accurate indication of pre-positioning status to within 15 minutes. Alternatively, the management server 16 requests status reports 38$n$ on demand, such as in response to an operator query 54, requiring immediate current status.

FIG. 6 is an exemplary catalog 22, and FIG. 7 is an example of a replication status report 38$n$ generated by the replication status reporting device 20 of FIG. 5. Referring now to FIGS. 5, 6 and 7, an exemplary replication status report 38 corresponding to the catalog 22 is shown. As indicated above, the replication status reports 38$n$ indicate the status within ordering category 42$a$. Each ordering category 42$a$ corresponds to a particular origin server 42$b$ and a particular priority 42$c$, and accordingly the ordering category 42$a$ is deterministic of the origin server 42$b$ and priority 42$c$, as illustrated in the replication status report 38 in FIG. 7. Alternate embodiments employ the fields other than origin server field 42$b$ and priority field 42$c$ to indicate each specific ordering category 42$a$.

Such ordering categories 42$a$ facilitate organization of the content items 25 in each of the channels 18. Ordering by origin server 42$b$ provides that an accessible or slow link to a particular origin server 42$b$ does not impede pre-positioning of content items 25 from other origin servers 42$b$. Ordering by priority 42$c$ allows the fetch logic 30$n$ to determine a fetching order for the content items 25, and accordingly apportion the files 25 which are likely to not be needed or are rather large and would therefore impede other files 25 from pre-positioning. For example, a particular origin server 42$a$ may have a single critical content item 25, and a large number of less important, but still necessary, content items 25. The larger number of content items 25 will take a long time to pre-position. Accordingly, assigning the critical content item a higher priority 42$c$ insures that the content server 20$n$ will select and pre-position the critical content item 25 before pre-positioning the larger number of less important content items 25.

Therefore, continuing to refer to FIG. 6, the catalog 22 includes a plurality of event records 60$a$-60$m$ (60$n$ generally), each containing entries for each of the fields 40$a$-40$d$. The file info field 40$a$ includes information concerning pre-positioning of a particular file, such as location, file name, and other logistic information concerning the actual disposition of the file. For clarity, the file info fields 40$a$ show an exemplary filename. The origin server field 40b indicates the origin server 12n from which the file emanates, and determines, along with the priority field 40c, the ordering category for a particular set of files 25. The event number field 40d indicates an ongoing continuum of pre-positioning events. Each of the pre-positioning events receives an event number 40d, thereby forming an event history in the catalog 22. As will be described further below, since the event numbers 40d represent unique points in an increasing continuum, the processing of current event numbers from the catalog indicates processing of the preceding event numbers in the catalog (except for the error list, described further below), and accordingly indicates pre-positioning attempts for the files (i.e. content items 25) corresponding to those events 60n.

The events 60a-60m corresponding to pre-positioning operations are shown in the catalog 22. The events 60a-60m each indicate a particular pre-positioning operation, such as adds, deletes, updates and modify for a content item 25. For example, events 60a-60c address files 1001, 1002, and 1003 respectively. As each of these events emanates from origin server 12a and at priority one, they share the same ordering category 42a, as illustrated in entry 62a of FIG. 7.

The file info fields 40a, in the example shown in FIG. 6, indicate a file, and an operation corresponds to a pre-positioning event. The file operations include add, update, modify, and delete. Alternate embodiments may employ other file operations. An add operation indicates that content servers 20n should store the corresponding file from the origin server. A modify operation changes a particular file, and an update operation supercedes an existing file with one of the same name by overwriting the existing file. For example, events 60a and 60b add, or pre-position, files 1001 and 1002 respectively. The event 60c updates a pre-existing file 1003. The event 60g adds the file 1016, and event 601 modifies the same file. The event 60j corresponding to event number E31 updates file 1016, indicating complete overwrite.

The exemplary catalog 22 includes other events as well. The illustrated events in FIG. 6 are by way of example, and not meant to necessarily represent the entire catalog 22. Alternate embodiments include other entries 60n in addition to those shown. Further, the catalog 22 groups events by origin server and priority 40b, 40c, respectively. As indicated above, the origin server and priority (40b, 40c) determine the ordering category, described further below, which groups events to provide a granularity level to the replication status reports 38n. Accordingly, the replication status reports 38n indicate pre-positioning within each of several ordering categories 42a, as will now be described.

FIG. 7 shows an example of replication status report 38n. Referring to FIGS. 6 and 7, the replication status report 38 indicates a progression along a continuum of the events 60n from the catalog 22, for each of several ordering categories 42a. The replication status report 38 shown in FIG. 7 is intended to be illustrative of the types of information conveyed, rather then conveying the most efficient implementation. Accordingly, in a particular implementation, certain described fields are deterministic of other fields and may be omitted as an optimization efficiency. The replication status reports 38 include the fields: ordering category 42a, origin server 42b, priority 42c, event number 42d, error list 42e, and highest event number 42f. The ordering category 42a groups sets of files according to the origin server 42b from which the file emanates, and the priority 42c, which indicates the importance, or urgency, of the file. As is observable from FIG. 7, the ordering category 42a is deterministic of a particular priority 42c from a particular origin server 42b. Alternate configurations employ other criteria for defining the ordering category 42a, however origin server 42b and priority 42c are illustrative.

As illustrated in the replication status reports 38, each field 42n in the replication status report 38 indicates the progression of events 60a-60m along the continuum of events 60n applicable to a particular origin server 42b and priority 42c. Since the event numbers shown in field 40d are in order, a current event 60n is indicative of the event progression through previous events. Further, the error list field 42e indicates events for which the content server 20n encountered errors, therefore indicating a particular file 40a for which pre-positioning did not occur.

For example, referring to entries 60a-60c in the catalog 22, three events E11, E12 and E15, corresponding to each respective entry 60 a-60c are listed. The event E12 60b, indicates completion of event E11 60a. Event 15 has not yet occurred, as shown by the replication status report 38 entry 62a. However, the replication status report 38 need indicate only completion of event E14 to conclude completion of event E11 60a. The management server 16, for example, need only receive an indication for the event number E12 60c to know that event E11 has occurred. Also included in the replication status report 38 is the highest event number field 42f, which is the highest event number known to the content server 22, and is used to determine timeliness (e.g. staleness) of a replication status report 38 and a catalog 22, discussed further below.

As will be described further below, the replication status report 38 is augmented by an error list and a present list. The error list and present list indicate exceptions to the logic rule that event processing occurs in sequential order according to event number. The error list indicates events below (less than) the current completed event which failed processing or otherwise did not occur. The present list indicates events above (greater than) the currently completed event which have completed (i.e. the content item they refer to is present). Accordingly, the content server 20n computes replication status by examining the most recent event (current event) completed, less any content items on the error list (i.e. have been passed over), plus any content items on the present list (have been pre-positioned in advance).

The replication status report 38 includes entries 62a-62f, thereby addressing each ordering category 42a. As indicated above, the ordering category 42a is a subdivision of the catalog 22 according to predetermined criteria, such as origin server 42b, and priority 42c, in the example shown. For each ordering category 42a, the entry 62n indicates the event number 42d and the error list 42e. The event number 42d indicates, for the events within that ordering category 42a of the catalog 22, the current event, or corresponding file 25, for which the content server 20n has completed pre-positioning. The error list 42e indicates the events in that ordering category below the event number 42d for which pre-positioning was unsuccessful.

Therefore, a current pre-positioning status for particular ordering category 42a, shown by the event number 42d, indicates pre-positioning of all previous events 40d, and therefore the corresponding files 25, except those on the error list 42e. Accordingly, the management server 16 need only receive the catalog 22 once, from the root server 20n, or other content server 20n, and receive a replication status report 38 from each content server 20n in the channel in order to compute the current channel 18 manifest, or list of files 25 for which pre-positioning is complete for the channel 18 in question. Therefore, the management server 16 does not need to receive a full manifest for each content server 20, in order to ascertain and provide status on each of the content servers 20n to a user 14.

Note that the events 60n in the catalog 22 are shown ordered by origin server 40b and 40c for illustrative purposes. The catalog 22 is a set of events labeled by event number 40d, and contains a series of event records 60n in an arbitrary order. Construction of the replication status report 38 includes identifying the events by the ordering categories 42a, and determining the completion of the events, either by event number 40d, as shown, or time of occurrence, time of receipts, or other mechanism. In a particular arrangement, the content servers maintain such status information in real time, therefore mitigating traversal of passed events and completion thereof.

By way of further example, referring to ordering category 4, entry 62d in the replication status report 38, ordering category 42a corresponds to pre-positioning of files from origin server (42b) 12b, of priority (42c) one. In the catalog 22, entries 60d-60f correspond to ordering category 4. The latest event 40d in the catalog 22 is event E24, as indicated by entry 60f. However, the origin server 12b encountered problems pre-positioning files 1005 and 1006, corresponding to entries E22 and E23, entries 60d and 60e, respectively. Accordingly, the replication status reports 38 indicates, in entry 62d, successful pre-positioning of files 25 up to those included in event 24, i.e. file 1007, except for files implicated by events E22 and E23, as indicated by the error list column 42d entry for ordering category 4 (62d). Therefore, the operator initiating a query 50 from the management GUI 36 at the management server 16 receives, via the replication status reports 38, an indication that all files up through event E24 are ready for publication, as pre-positioning has occurred up through event E24, except for files E22 and E23.

As an additional example, entry 62e indicates that event number E31 (42d) was the previous pre-positioning event. Referring to catalog 22 entries 60g-60j, event 60g adds, or pre-positions file 1016. Event E30 modifies file 1016, as shown by entry 601, and event E31 updates, or supercedes, file 1016 as shown by entry 60j. Accordingly, completion of pre-positioning events up through event E30, for ordering category 5, included the supercession of file 1016 as indicated by event E31 (60j). However, the replication status reports 38 need not indicate the add of event E25 and E26 (60g, 60h)) or the modification of file 1016 at event E30 of entry 601. Since the management server 16 need only obtain a full catalog 22 once, from any content server 20n, the current replication status, as shown by entry 62e, allows the management server 16 to compute the current replication status 38 for the particular ordering category (62e, 42a) 5 in this example.

Further, the management server 16, via the management GUI 36, is operable to perform a variety of queries concerning pre-positioning status. The exemplary replication status reports 38, applicable to the catalog 22, are representative of the replication status reports from each of the content servers within the channel 18. Accordingly, such replication status queries 54 and the complementary replication status reports 38 (responses) may include parameters such as the percentage of successful pre-positioning of files 25, the percentage of content servers 20n having a particular file 25, or the files 25 for which pre-positioning is complete, to indicate several. A variety of queries concerning pre-positioning via the replication status reports 38 are applicable in alternate configurations, and will be apparent to those of skill in the art.

FIG. 8 shows an alternate configuration depicting different versions of a catalog 22 propagated to content servers 20n. Referring to FIG. 8, the management server 16 supports three content servers 20-10, 20-11 and 20-12. Each of the content servers 20n includes, for each ordering category 42a, status information 44-10-44-12 and a high event number 46-10-46-12. Both the status information 44-n and the high event number 46-n correspond to the current catalog 22 at the content server 20n. The status information 44-n indicates the highest event number associated with a file which the particular content server 20 has pre-positioned at that ordering category. The high event number 46-N is indicative of the highest (greatest) event number known to the content server, though not necessarily completed. The event numbers corresponding to the progression thresholds in the replication status report 38 indicate completion of the events, i.e. successful pre-positioning. Generally, each content server 20n maintains its own version of the catalog 22, which is subject to periodic updates and propagation across the content severs 20n of the channel 18. The propagation and dissemination of the catalog 22 is discussed in further detail in copending U.S. patent application entitled "Methods and Apparatus for Performing Content Distribution in a Content Distribution Network," referenced above.

The management server 16, or a content server 20n interpreting the replication status reports 38, compares the reports to a reference version of the catalog 22 which is obtained from a suitable reliable source such as one of the content servers 20n. Accordingly, the management server 16 interprets the replication status reports 38 in view of the reference catalog 37. In the exemplary channel 18 system above, the typical management server 16 looks to another server 20n to obtain the reference catalog 37, however, such is not always the case. Further, the management server 16 may itself be a content server and rely on it's own catalog 22 as the reference catalog 37.

Therefore, the management server 16 performs a validation check on a replication status report 38 to determine applicability, or validity, of the replication status report 38. Since the replication status reports 38 represent the progression threshold relative to the events in the catalog 22, a stale catalog may not provide a deterministic indication of status of a particular content item 25.

Each of the events propagated to the content servers 20n corresponds to a particular content item 25, or file, as indicated in the exemplary catalog 22 shown above in FIG. 7. If a later event affects a file added by an earlier event, a catalog 22 which reflects only the earlier event will indicate an invalid status for the content item 25. Such an event includes those which change an attribute, but not the existence (presence) of a content item 25 (file). For example, as shown above, the ordering categories 42a categorize events 40d by priority. An earlier event adds a file 'xyz' at priority 3. A later event changes the priority of file 'xyz' to priority 1. However, a catalog having only the earlier event is referenced by a replication status report 38, would list file 'xyz' in the ordering category associated with priority 1. Accordingly, if a later event changes the priority of a content item added by an earlier event, the catalog 22 having only the earlier event will indicate an erroneous priority for the content item 25.

The management server 16 performs a check to determine the accuracy of the replication status reports 38 as applied to the reference catalog 37. This check determines if the reference catalog 37 at the management server 16 is sufficiently current to provide accurate replication status with respect to a particular event, or if more information may be needed to ensure that a false negative or positive result is not propagated. Such additional information typically includes obtaining an updated version of the catalog. In general, if the representative catalog at the management server is at least as recent as the catalog at the content server upon which the replication status report is based, then the report is acceptable as valid with respect to the events contained in it. However, if the representative catalog is based on a lower event number than that upon which the replication status report is based, the report may not be deterministic. This is because an intervening event not considered for the reference catalog may have had an effect on existing event numbers and actually changed such event numbers.

In further detail, for example, if the event number (e#) of the reference catalog 37 is lower, then we can't make sense of the report. E.g., suppose the missing event changed the priority of file f to a lower priority. In fact, such may not be the case, therefore some or all of the information may be accurate. Nonetheless, a deterministic, accurate report may not be computed when events remain unaccounted for. The report indicates that f hasn't been fetched because its number is greater than the number reported for the new category. But in the reference catalog, f is listed at the lower event number and in the old category. And it may be that the number reported for that category is higher than f's old number e.g., f was 5, is now 15, and it previously was in category 1 and is now in category 2. The report says:

<Ord. Cat. 1, E #6>, <Ord. Cat. 2, E #10>

This report says f isn't fetched yet, because its number is >10, the reported number for its new category. But at the management server, it seems that its number is 5 and that we should use category 1 to decide. And doing this indicates that f has been fetched, which is incorrect. NOTE that the number associated with file f has changed. And note also that it is important for the number to change, since otherwise the wrong result would happen, even if the management server had a complete representative catalog.

Now consider the opposite situation, where the representative catalog is more recent. In this case, the processing simply needs to avoid making decisions about files whose current number is greater than the highest number known to the content server who sent the report. But all the other info is deterministic.

In further detail, FIG. 8 shows three exemplary content servers 20-10-20-12. The management server 16 obtains the reference catalog 37 from the content server 20-10, having a high event number of 100, as shown by a propagation message 88. As indicated above, the replication status reports mitigate the need to propagate the entire catalog 22 for each update. Accordingly, the catalog 22 propagates by a variety of methods such as those disclosed in the copending application cited above.

Content server 20-11 sends a replication status report 89 based on a catalog 20 having a high event number 46-11 of 95. Accordingly, since the highest event number 52 of the reference catalog is greater than the high event number 46-11 of the report 89, the report 89 is applicable and indicates a deterministic status.

Content server 20-12 sends a replication status report 90. The replication status report 90, however, ranges up through a high event number 46-12 of 105. Accordingly, the replication status report 90 references events greater than the highest event number 52 of the reference catalog 37. Accordingly, events 101-105 are unknown and the management server 16 concludes that more information is required to compute a deterministic status.

Therefore, given only the progression threshold within the ordering category 42a in the replication status report 38, the present invention attempts to compute the replication status for the content items (files) in the channel 18, if a sufficiently current reference catalog is available, and further, to identify when a deterministic status is not immediately available due to a stale reference catalog 37. Replicated files 25 may still be, in fact, available, but given the information present in the replication status report 38 and reference catalog 37 alone, are not deterministic. The management server 16 should obtain a current reference catalog 37 in order to complete a status inquiry.

Thus, the operator is alerted to queries for which more information is needed to accurately and deterministically ascertain status. In this manner, most, if not all, replication status information is reported and processed with a minimal amount of bandwidth overhead for the replication status report, rather than consuming large amounts of bandwidth for transmitting an entire catalog to each of the content servers 20.

Figure 9:
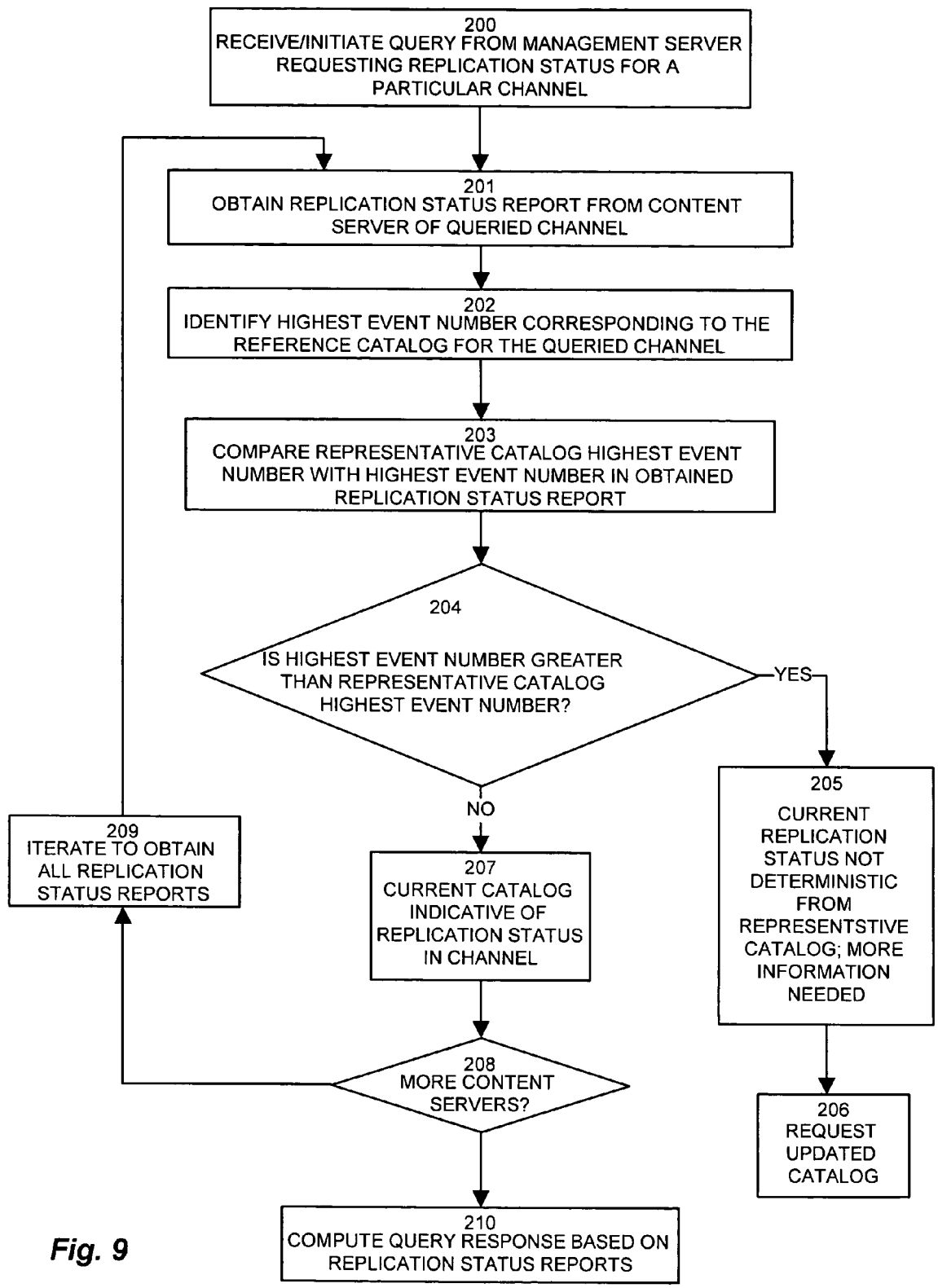
FIG. 9 shows a flowchart of resolving catalog versions in the system of FIG. 8.

FIG. 9 shows a flowchart of resolving catalog versions in the system of FIG. 8, and illustrates the test to determine accuracy of the reference catalog 37 with respect to a replication status report 38. Referring to FIGS. 8 and 9, at step 200, a content server 20n receives a request for replication status of a particular channel 18, from which the status of an individual content item 25 is obtainable. Such a request may be an automated, periodic response, such as after an event completion, or in response to a proactive query. In response, the management server receives a status report 38 corresponding to the channel 18. Additional, file (content item) specific queries may occur subsequently.

At step 201, the content server 20n replies with a status report 38 for the channel 18. Note that instead of requesting the status report 38, the management server 16 may instead use a report it obtained through periodic status reporting. At step 202, the management server 16 identifies the highest event number of the reference catalog of the channel for which status is sought.

At step 203, the management server compares the replication status report 38 it obtained from the content server 20n to the highest event number 52 for the reference catalog 37 at the management server 16. The management server performs a check, at step 204, to determine if the highest event number 46-n from which the replication status report 38 is based is higher than the highest event number 52 for the reference catalog 37. If it is greater, as depicted at step 205, the current replication status is not deterministic from the current representative reference catalog 37 and more information is needed. At step 206, this result may prompt an update and repropagation for the reference catalog. In such an instance, the management server 16 will attempt to update its reference catalog, as disclosed in the copending patent application cited above.

At step 207, if the high event number of the replication status report 38 is not greater than that of the reference catalog 37, then the report 38 is applicable and the reference catalog 37 is indicative of the replication status in the channel 18. Note that event in the event of a sufficiently up-to-date reference catalog 37, it is possible that the status of the files in question is still undeterministic. Therefore, if the report number (status report highest event number) is ok, the management server 16 performs a lookup for event number and ordering category for file 25 (event) of interest in the representative catalog 37. If event number is greater than the largest event number reported in the status report 38, then we cannot determine the file status for that content server 22, since the content server 22 lags the reference catalog 37 (although other events included in the content server's status report 38 are deterministic, since the reference catalog is more up-to-date). Otherwise we know its status by reading that part of the report 38 covering the ordering category of the file 25.

At step 208, a check is performed to see if all content servers 20 have submitted replication status reports 38. At step 209, if not, control reverts to step 201 to iterate and gather additional replication status reports 38. If the management server has received all replication status reports 38, then at step 210, the management server 16 computes the global replication status for the channel 18, or alternately, for the particular content item 25 by examining and aggregating the events in the reference catalog 37 which are applicable to the content item 25 corresponding to the query. The management server 16 reads the replication status report 38 for the progression threshold within the ordering category corresponding to the particular content item 25 for which status is sought, as different ordering categories 42a and/or content items 25 may be present in the report 38.

Since the events in the catalog 22 occur in sequence (i.e. are covered in order) within a particular ordering category (e.g. priority), the indication of a particular event implies that previous events, and therefore disposition of the files (content items) corresponding to the events, within that particular ordering category are also complete, subject to the implications of the error list and the present list, described above. In alternate configurations, as disclosed above, a variety of queries are processed, including multiple content items or all content items in the catalog 22.

The management server 16, in the above description, performs exemplary operations depicting operations in a particular configuration of the invention. Alternate configurations implement the operations and functions of the management server 16 in a more local format in a particular channel 18, such as another content server 20n. Further, such operations and functions may be located in components delivered as part of a larger system, such as integrated in a router or other switching device, or as part of a more global network management server such as an SMNP server.

Figure 10:
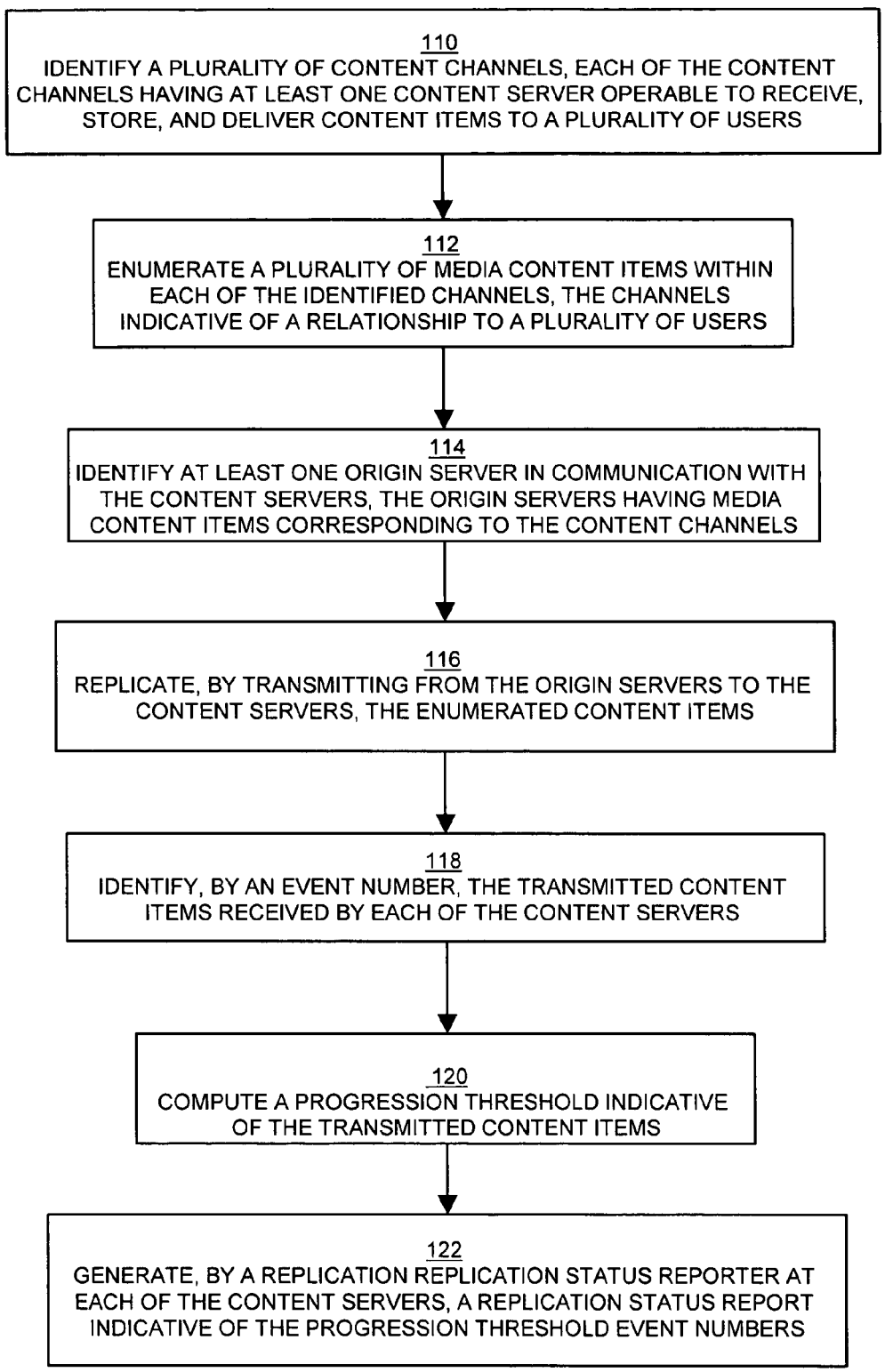
FIG. 10 is flowchart of gathering and reporting replication status in the channels in further detail.

FIG. 10 is flowchart of gathering and reporting replication status in the channels 18a-18c of FIG. 3 in further detail. Specifically, FIG. 10 discloses the methods employed in the CDN 10 for obtaining replication status from a plurality of channels as described herein. Referring to FIG. 10, the steps occurring in generating a replication status report 38 indicative of replication status in a channel 18 are shown, which the management server 16 may employ in response to an operator query 54. At step 110, the management server 16 identifies a plurality of content channels 18a-18c, each having at least one content server 20n operable to receive, store, and deliver content items 25 to a plurality of users 14. At step 112, the management server 16 enumerates a plurality of media content items 25 within each of the identified channels 18 by gathering replication status reports 38 from each of the status reporters 32n, as described above in the flowchart in FIG. 2. As indicated above, each channel 18 is indicative of a relationship to a plurality of expected users 14 for the files 25 in the channel 18, such as a grouping of files 25 topically germane to a particular user 14 set, e.g. as in the sales data example given above.

At step 114, one or more of the content servers 20n identifies at least one origin server 12 in communication with the content servers 20n, the origin servers 12 having media content 25 items (files) corresponding to the content channels 18. Each file 25 for pre-positioning emanates from a particular origin server 12. Further, the set of files 25 in a channel 18 may emanate from a plurality of origin servers 12.

At step 116, the content servers 20n, after identifying the origin server 12, replicate the content items 25 by transmitting from the origin servers 12 to the content servers 20n, the enumerated content items 25. As indicated above, each of the content servers 20n maintains a catalog 22n, which is a list of files which should be in a particular channel 18n. Ideally, the catalog 22n for a particular channel 18n would be identical for each content server 20n, however such is often not the case due to propagation constraints. As the content servers 20n in a channel 18 scan through the catalog 22n to pre-position the media content items 25 in the channel 18, the content servers 20n identify and replicate, or download, from the origin servers 12 according to the file info from the catalog 22n, described further below. Each of the content servers 20n attempts to maintain files 25 reflective of the its catalog 22n.

At step 118, each content server 20n in the channel identifies, by the event number, the transmitted content items 25 received by each of the content servers 20n. A monitoring process such as a status daemon 34a (already described above in FIG. 5) monitors the pre-positioning downloads and informs the corresponding status reporter 32 when a content item 25 completes pre-positioning or when an error occurs such that the status reporter 32 updates the replication status report 38n accordingly.

At step 120, the replication status reporter 32 computes a progression threshold indicative of the transmitted content items 25 by examining which events the status daemon 34a indicates as completing pre-positioning. Since the events in the catalog 22n are generally indicative of the order of pre-positioning, subject to media content item 25 availability and the fetch logic, the most recent event indicates the progression (i.e. previous events have been satisfied, that is, have completed pre-positioning).

At step 122, the replication status reporter 32 generates a replication status report 38 including the status information indicative of the progression threshold event numbers. Additionally, the replication status reporter 32 also determines unsuccessful attempts to pre-position files. The replication status reporter 32 lists unsuccessful files 25 in an error list in the replication status report 38. When a particular content server 20n is unable to download a file 25, due to an inactive link or slow transmission line, for example, the fetch logic 30n, discussed further below, indicates when to skip the file 25 and progress to subsequent events to avoid impacting pre-positioning for the remaining events. Accordingly, a single corrupt file 25 or link will not prevent other content items 25 from successful pre-positioning. In this manner, the replication status report 38, being indicative of the current pre-positioning event, indicates pre-positioning of all previous events in the catalog 22 except the events on the error list (42e, FIG. 7, discussed further below).

In alternate implementations, data structure optimizations may be employed. Error lists can be shortened by using ranges. For example the error-list [25, 37, [39-43], 53] indicates that the files with event numbers between 39 and 43 inclusive have not been fetched, in addition to the other files whose event numbers are stated explicitly. The range only applies to files at that ordering category, and therefore it can include the event numbers of files not at that ordering category, since reports are interpreted per ordering category as discussed above.

However, even with ranges, error-lists might be excessively large. This could happen in the case of an ill-formed channel, e.g., one where lots of the files in the catalog don't exist at the origin server. In this case we can change our reporting strategy in one of two ways.

The first is to use a pessimistic approximation for the event number and error-list in the tuple. The size of the error-list is capped at some bound; this bound can be a system configuration parameter. When the bound is reached, we reduce the reported event number to a small enough value that no additional entries are needed in the error-list. This approach guarantees that only files that have been fetched are considered to be present at the content server. But some files that are actually present will be considered absent. Thus it may lead to a lower replication status for some file than actually exists. However, this under-reporting is acceptable, since the main requirement is to never over-report. Further, the situation that would lead to the problem is rare.

In other alternate implementations, efficiency is improved by adding a "present-list" to the report, as described above. Thus a report now contains an event number (e#), an error-list, and a present-list. The present-list lists the event numbers of files that are present but whose event number is greater than e#. Like the error-list, the present-list can contain both individual entries and ranges. The second approach allows us to provide complete information in cases where the first approach cannot. However, the second approach can still lead to lists that are too big. In this case we can select e# as in the first approach, and we can limit the size of the present-list as well (this limit would also be a system parameter). This approach will still cause some files that are present being considered as absent, but fewer than in the first approach.

The above described methods allow a management server to have complete information about the replication status for a channel while requiring very little information to be transmitted from the content servers. The management server needs to get a complete description of the channel content from just one server. It requires only small status reports from all the servers assigned to that channel.

Further, such methods keep status reports small by organizing them based on ordering categories. Files in a particular category are fetched in event number order; therefore we can use event numbers to summarize the status within that category. These reports are accurate and complete even though the set of files in the channel changes over time and different content servers for the file may have different knowledge about what files are in the channel.

Such methods are substantially better than alternative approaches for providing replication status in content delivery networks. And it is especially desirable when channels are large, when there are large numbers of content servers, and when some of the content servers might only be able to communicate with the management server over slow or low-bandwidth links.

Those skilled in the art should readily appreciate that the programs and methods for reporting replication status in a CDN as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for reporting replication status has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. In an information services network having channels, each channel including a plurality of content items, a management server and a group of content servers, at least one channel including items to be served from at least one content server in the group of content servers, where channel items vary over time, and items are replicated from origin servers to the content servers that serve the channel, a method of reporting replication status from the group of content servers in a channel comprising:

maintaining a channel description of content via a sequence of change events, each event indicative of action for a particular file and each event having an associated incrementing event number such that each successive event has an increasing event number;

identifying, upon completion of a particular change event, the event number corresponding to the event as completed, the change events further comprising ordering categories, each of the change events corresponding to one of a plurality of ordering categories, the ordering categories indicative of an alternate ordering criteria;

reporting, for each of a plurality of content servers in the channel, an indication of event completion via a threshold event number, the threshold number being a progression threshold corresponding to a point of progression in the incrementing event numbers, the channel description maintained as status information in the content servers, the status information including the progression threshold within each of the ordering categories, wherein the replication status report omits transmitting cumulative, file specific information deterministic from the progression threshold; and aggregating reports from the plurality of content servers to obtain a global status report.

2. The method of claim 1 wherein the change event is add/delete for a particular file in the channel.

3. The method of claim 1 wherein the ordering category is indicative of a replication priority for the corresponding file.

4. The method of claim 1 wherein the ordering category is indicative of an origin server for the corresponding file.

5. The method of claim 1 wherein the threshold event number is a progression threshold for each of the ordering categories and the reporting further comprises the progression threshold for a plurality of ordering categories.

6. The method of claim 1 wherein the status report further includes an incomplete list, the incomplete list indicative of files having an event number previous to the reported event number for which event completion has not occurred.

7. The method of claim 1 wherein the status report further report includes a present list, the present list indicative of files having an event number successive to the reported event number for the ordering category and for which the event is completed.

8. The method of claim 1 wherein the indications of event completion further includes absolute and range references.

9. The method of claim 1 wherein aggregating includes obtaining the channel description from one of the content servers and interpreting status reports from content servers using the obtained channel description as a reference channel description.

10. The method of claim 1 wherein the channel description has a maximum event number and each of the status reports also has a maximum event number, further including comparing that the maximum event number for the channel description is not less than the maximum event number of each of the status reports.

11. The method of claim 9 further comprising validating the accuracy of the status report, accuracy being indicated such that the management server can interpret a status report if its highest event number is not greater than highest event number of the reference channel description.

12. The method of claim 11 wherein if management server cannot interpret a report it refreshes information in the reference catalog such that reference channel description accurately reflects current information.

13. The method of claim 11 wherein if management server can interpret a report, it computes whether it can determine status of a particular content item, using the item's event number in the reference catalog, such that:
   if the event number is greater than the largest event number sent in the status report, then the status of that item cannot be determined; and
   if the event number in the reference catalog is equal to or less than the largest event number in the status report, an accurate report can be determined.

14. The method of claim 13 wherein if an accurate status report can be determined, examining the report for the ordering category corresponding to the particular content item from the reference catalog, such that the particular content item is computed to be present if:
   the corresponding event number is less than or equal to the threshold of that category; and
   the corresponding event number is not in the incomplete list.

15. The method of claim 14 wherein the particular content item is computed to be present if the corresponding event number is listed in the present list.

16. The method of claim 13 wherein, if an accurate status report cannot be determined, the management server selectively:
   reports inability to compute the accurate status report, or
   requests more current information from a content server such that the reference channel description reflects current information.

17. The method of claim 1 wherein aggregating the reports further comprises computing a ratio of files which have been replicated at each of the set of content servers in the channel.

18. The method of claim 1 wherein aggregating the reports further comprises computing a ratio of the content servers in the set which have replicated a particular file.

19. The method of claim 1 wherein the global status report is produced in response to an operator request.

20. A data communications device comprising:
   a processor;
   an interface to an information services network having channels, each channel including a plurality of content items, a management server and a group of content servers, at least one channel including items to be served from at least one content server in the group of content servers, where channel items vary over time, and items are replicated from origin servers to the content servers that serve the channel, a method of reporting replication status from the group of content servers in a channel; and
   a memory, the memory operable to store instructions, the processor operable on the instructions to:
   maintain a channel description of content via a sequence of changes events each event change indicative of action for a particular file and each change having an associated incrementing event number such that each successive event has an increasing event number;
   identify, upon completion of a particular change event, the event number corresponding to the event as completed, the change events further comprising ordering categories, each of the change events corresponding to one of a plurality of ordering categories, the ordering categories indicative of an alternative ordering criteria;
   report, for each of a plurality of content servers in the channel, an indication of event completion via a threshold event number, the threshold number being a progression threshold corresponding to a point of progression in the incrementing event numbers, the channel description maintained as status information in the content servers, the status information including the progression threshold within each of the ordering categories, wherein the replication status report omits transmitting cumulative, file specific information deterministic from the progression threshold; and
   aggregate reports from the plurality of content servers to obtain a global status report.

21. The data communications device of claim 20 wherein the change events further comprise add and delete events for a particular file in the channel.

22. The data communications device of claim 20 wherein the change events further comprise ordering categories, each of the change events corresponding to one of a plurality of ordering categories, the ordering categories indicative of an alternate ordering criteria.

23. The data communications device of claim 20 wherein the status report further report includes an incomplete list the incomplete list indicative of files having an event number previous to the reported event number for which event completion has not occurred.

24. The data communications device of claim 22 wherein the status report further report includes a present list, the present list indicative of files having an event number successive to the reported event number for the ordering category and for which the event is completed.

25. The data communications device of claim 22 wherein the ordering category is indicative of a replication priority for the corresponding file.

26. The data communications device of claim 22 wherein the ordering category is indicative of an origin server for the corresponding file.

27. The data communications device of claim 20 wherein the threshold event number is a progression threshold for each of the ordering categories and the reporting further comprises the progression threshold for a plurality of ordering categories.

28. The data communications device of claim 22 wherein the channel description is maintained as status information in the content servers, the status information including the progression threshold within each of the ordering categories, wherein the replication status report omits transmitting cumulative, file specific information deterministic from the progression threshold.

29. A method for reporting replication status of media content in a content delivery network (CDN) comprising:
identifying a set of content items for replication at a content server;
enumerating a set of change events indicative of content items received, via the replication, at the content server from the identified set of content items, the change events further comprising ordering categories, each of the change events corresponding to one of a plurality of ordering categories, the ordering categories indicative of an alternate ordering criteria; and
reporting the enumerated content items received by indicating a progression threshold within each of the ordering categories in the identified set corresponding to the enumerated content items, the reporting omitting transmitting cumulative, the specific information deterministic from the progression threshold.

30. The method of claim 29 further comprising subdividing the identified set of content items into ordering categories indicative of a subset of the identified content items and reporting further includes reporting the progression threshold for each ordering category.

31. The method of claim 30 wherein the ordering categories are further indicative of a priority for a subset of the content items from the identified set of content items to be stored at the content server.

32. The method of claim 30 wherein the ordering categories are further indicative of an origin server from which the subset of identified media items emanates from.

33. The method of claim 29 wherein reporting further comprises reporting an incomplete portion indicative of identified content items within the progression threshold which have not yet been received at the content server.

34. A data communications device for reporting replication status of media content in a content delivery network (CDN) comprising:
at least one content server operable to receive a channel manifest identifying a set of content items for replication at the content server and further operable to fetch the identified content items from at least one origin server in communication with the content server;
a catalog indicative of content items in the channel manifest received by the content server from the origin servers;
a replication status daemon operable to enumerate set a set of change events indicative of content items received at the content server from the identified set of content items in the channel, the change events further comprising ordering categories, each of the change events corresponding to one of a plurality of ordering categories, the ordering categories indicative of an alternate ordering criteria; and
a replication status reporter operable to report the enumerated content received by indicating a progression threshold within each of the ordering categories in the identified set of content items corresponding to the enumerated content received by the content server, the replication status reporter omitting transmitting cumulative, file specific information deterministic from the progression threshold.

35. The data communications device of claim 34 further comprising a plurality of order categories, wherein the replication status reporter is operable to subdivide the identified set of content items into ordering categories indicative of a subset of the identified content items and further operable to report the progression threshold for each ordering category.

36. The data communications device of claim 35 wherein the ordering categories are further indicative of a priority for a subset of the content items from the identified set of content items to be stored at the content server.

37. The data communications device of claim 36 wherein the ordering categories are further indicative of an origin server from which the subset of identified media items emanates from.

38. The data communications device of claim 34 wherein the replication status reporter is further operable to report an incomplete portion indicative of the identified content items within the progression threshold which have not yet been received at the content server.

39. A method for generating replication status reports indicative of a replication status of media content items in a content delivery network (CDN) comprising:
identifying a plurality of content channels, each of the content channels having at least one content server operable to receive, store, and deliver content items to a plurality of users;
enumerating a set of change events indicative of a plurality of media content items within each of the identified channels, the channels indicative of a relationship to a plurality of users, the change events further comprising ordering categories, each of the change events corresponding to one of a plurality of ordering categories, the ordering categories indicative of an alternate ordering criteria;
identifying at least one origin server in communication with the content servers, the origin servers having media content items corresponding to the content channels;
replicating, by transmitting from the origin servers to the content servers, the enumerated content items;
identifying, by an event number, the transmitted content items received by each of the content servers;
computing a progression threshold within each of the ordering categories indicative of the transmitted content items; and
generating, by a replication status reporter at each of the content servers, a replication status report indicative of the progression threshold event numbers, the generating omitting transmitting cumulative, file specific information deterministic from the progression threshold.

40. The method of claim 39 further comprising ordering categories, each of the ordering categories indicative of subdividing the enumerated content items within the channels, the ordering categories indicative of priorities for replicating the content items.

41. The method of claim 40 wherein the ordering categories further comprise a subdivision according to a respective origin server from which the content items emanate.

42. The method of claim 40 wherein the replication status report further comprises a set of event numbers corresponding to content items which have been received by the content server.

43. A system for propagating media content and reporting replication status of media content in a content delivery network (CDN) comprising:
at least one content server operable to identify a set of content items for replication at a content server;
a replication status daemon in the at least one content server operable to enumerate a set of change events indicative of content items received at the content server from the identified set of content items, the change events further comprising ordering categories, each of the change events corresponding to one of a plurality of ordering categories, the ordering categories indicative of an alternate ordering criteria; and a replication status reporter in the at least one content server operable to report the enumerated content received by indicating a progression threshold within each of the ordering categories in the identified set corresponding to the enumerated content items, the replication status reporter omitting transmitting cumulative, file specific information deterministic from the progression threshold.

44. A computer program product having a computer readable medium operable to store computer program logic embodied in computer program code encoded thereon for reporting replication status of media content in a content delivery network (CDN) comprising:

computer program code for identifying a set of content items for replication at a content server;

computer program code for enumerating a set of change events indicative of content items received at the content server from the identified set of content items, the change events further comprising ordering categories, each of the change events corresponding to one of a plurality of ordering categories, the ordering categories indicative of an alternate ordering criteria; and computer program code for reporting the enumerated content received by indicating a progression threshold within each of the ordering categories in the identified set corresponding to the enumerated content items, the reporting omitting transmitting cumulative, file specific information deterministic for the progression threshold.

45. A data communications device for reporting replication status of media content in a content delivery network (CDN) comprising:

means for identifying a set of content items for replication at a content server;

means for enumerating a set of change events indicative of content items received at the content server from the identified set of content items, the change events further comprising ordering categories, each of the change events corresponding to one of a plurality of ordering categories, the ordering categories indicative of an alternate ordering criteria; and means for reporting the enumerated content received by indicating a progression threshold within each of the ordering categories in the identified set corresponding to the enumerated content items, the reporting omitting transmitting cumulative, file specific information deterministic from the progression threshold.

* * * * *